United States Patent
Galpin et al.

(10) Patent No.: US 12,212,577 B2
(45) Date of Patent: *Jan. 28, 2025

(54) OPERATOR ACTION AUTHENTICATION IN AN INDUSTRIAL CONTROL SYSTEM

(71) Applicant: Analog Devices, Inc., Wilmington, MA (US)

(72) Inventors: Samuel Galpin, Nashua, NH (US); Timothy Clish, Taunton, MA (US); James G. Calvin, Attleboro, MA (US); Albert Rooyakkers, Sunnyvale, CA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,190

(22) Filed: Jun. 19, 2023

(65) Prior Publication Data
US 2024/0007478 A1    Jan. 4, 2024

Related U.S. Application Data

(63) Continuation of application No. 17/093,950, filed on Nov. 10, 2020, now Pat. No. 11,722,495, which is a
(Continued)

(51) Int. Cl.
*H04L 9/40* (2022.01)
*G05B 19/042* (2006.01)
(Continued)

(52) U.S. Cl.
CPC .......... *H04L 63/12* (2013.01); *G05B 19/0425* (2013.01); *G09C 1/00* (2013.01);
(Continued)

(58) Field of Classification Search
CPC . H04L 63/12; H04L 63/0853; H04L 63/0884; H04L 9/3234; H04L 9/3247;
(Continued)

(56) References Cited

U.S. PATENT DOCUMENTS 1,778,549 A   10/1930   Conner
1,961,013 A   5/1934    Battista et al.
(Continued)

FOREIGN PATENT DOCUMENTS

CN   2162746 Y   4/1994
CN   1408129 A   4/2003
(Continued)

OTHER PUBLICATIONS

Extended European Search Report for European Patent Application No. EP 14166908 Mailed on Jan. 7, 2015, 10 pages.
(Continued)

*Primary Examiner* — Robert B Leung
(74) *Attorney, Agent, or Firm* — Kevin E. West; Advent, LLP

(57) ABSTRACT

Operator actions and/or other commands or requests are secured via an authentication path from an action originator to a communications/control module or any other industrial element/controller. In implementations, an industrial control system includes an action authenticator configured to sign an action request generated by the action originator. The destination communications/control module or any other industrial element/controller is configured to receive the signed action request, verify the authenticity of the signed action request, and perform a requested action when the authenticity of the signed action request is verified.

20 Claims, 5 Drawing Sheets

Related U.S. Application Data continuation of application No. 14/519,066, filed on Oct. 20, 2014, now Pat. No. 10,834,094, which is a continuation-in-part of application No. PCT/US2013/053721, filed on Aug. 6, 2013, and a continuation-in-part of application No. 14/469,931, filed on Aug. 27, 2014, now Pat. No. 9,191,203, and a continuation-in-part of application No. 14/446,412, filed on Jul. 30, 2014, now Pat. No. 10,834,820.

(60) Provisional application No. 62/021,438, filed on Jul. 7, 2014.

(51) Int. Cl.
*G09C 1/00* (2006.01)
*H04L 9/32* (2006.01)

(52) U.S. Cl.
CPC .......... *H04L 9/3234* (2013.01); *H04L 9/3247* (2013.01); *H04L 63/0853* (2013.01); *H04L 63/0884* (2013.01); *G05B 2219/23342* (2013.01); *G05B 2219/24162* (2013.01); *G05B 2219/24167* (2013.01); *G06F 2212/175* (2013.01)

(58) Field of Classification Search
CPC ...... G05B 19/0425; G05B 2219/24167; G05B 2212/175
See application file for complete search history.

(56) References Cited

U.S. PATENT DOCUMENTS

| | | |
|---|---|---|
| 2,540,575 A | 2/1951 | Tomun et al. |
| 3,702,983 A | 11/1972 | Chace et al. |
| 4,079,440 A | 3/1978 | Ohnuma et al. |
| 4,082,984 A | 4/1978 | Iwata |
| 4,337,499 A | 6/1982 | Cronin et al. |
| 4,403,286 A | 9/1983 | Fry et al. |
| 4,508,414 A | 4/1985 | Kusui et al. |
| 4,628,308 A | 12/1986 | Robert |
| 4,656,622 A | 4/1987 | Lea |
| 4,672,529 A | 6/1987 | Kupersmit |
| 4,679,193 A | 7/1987 | Jensen et al. |
| 4,691,384 A | 9/1987 | Jobe |
| 4,789,792 A | 12/1988 | Ruedi |
| 4,882,702 A | 11/1989 | Struger et al. |
| 4,929,939 A | 5/1990 | Varma et al. |
| 4,932,892 A | 6/1990 | Hatch |
| 5,013,247 A | 5/1991 | Watson |
| 5,128,664 A | 7/1992 | Bishop |
| 5,229,652 A | 7/1993 | Hough |
| 5,325,046 A | 6/1994 | Young et al. |
| 5,378,166 A | 1/1995 | Gallagher, Sr. |
| 5,385,487 A | 1/1995 | Beitman |
| 5,385,490 A | 1/1995 | Demeter et al. |
| 5,388,099 A | 2/1995 | Poole |
| 5,422,558 A | 6/1995 | Stewart |
| 5,469,334 A | 11/1995 | Balakrishnan |
| 5,519,583 A | 5/1996 | Kolling et al. |
| 5,546,463 A | 8/1996 | Caputo et al. |
| 5,572,511 A | 11/1996 | Ouyang et al. |
| 5,590,284 A | 12/1996 | Crosetto |
| 5,602,754 A | 2/1997 | Beatty et al. |
| 5,603,044 A | 2/1997 | Annapareddy et al. |
| 5,719,483 A | 2/1998 | Abbott et al. |
| 5,724,349 A | 3/1998 | Cloonan et al. |
| 5,735,707 A | 4/1998 | O'Groske et al. |
| 5,757,795 A | 5/1998 | Schnell |
| 5,773,962 A | 6/1998 | Nor |
| 5,860,824 A | 1/1999 | Fan |
| 5,896,473 A | 4/1999 | Kaspari |
| 5,909,368 A | 6/1999 | Nixon et al. |
| 5,951,666 A | 9/1999 | Ilting et al. |
| 5,958,030 A | 9/1999 | Kwa |
| 5,963,448 A | 10/1999 | Flood et al. |
| 5,980,312 A | 11/1999 | Chapman et al. |
| 6,002,675 A | 12/1999 | Ben-Michael et al. |
| 6,009,410 A | 12/1999 | Lemole et al. |
| 6,016,310 A | 1/2000 | Muller et al. |
| 6,046,513 A | 4/2000 | Jouper et al. |
| 6,104,913 A | 8/2000 | McAllister |
| 6,124,778 A | 9/2000 | Rowley et al. |
| 6,178,474 B1 | 1/2001 | Hamano et al. |
| 6,218,740 B1 | 4/2001 | Mildice |
| 6,219,789 B1 | 4/2001 | Little et al. |
| 6,220,889 B1 | 4/2001 | Ely et al. |
| 6,347,963 B1 | 2/2002 | Falkenberg et al. |
| 6,393,565 B1 | 5/2002 | Lockhart et al. |
| 6,435,409 B1 | 8/2002 | Hu |
| 6,453,416 B1 | 9/2002 | Epstein |
| 6,480,963 B1 | 11/2002 | Tachibana et al. |
| 6,490,176 B2 | 12/2002 | Holzer et al. |
| 6,574,681 B1 | 6/2003 | White et al. |
| 6,597,683 B1 | 7/2003 | Gehring et al. |
| 6,643,777 B1 | 11/2003 | Chu |
| 6,680,904 B1 | 1/2004 | Kaplan et al. |
| 6,695,620 B1 | 2/2004 | Huang |
| 6,714,541 B1 | 3/2004 | Iyer et al. |
| 6,799,234 B1 | 9/2004 | Moon et al. |
| 6,812,803 B2 | 11/2004 | Goergen |
| 6,814,580 B2 | 11/2004 | Li et al. |
| 6,828,894 B1 | 12/2004 | Sorger et al. |
| 6,840,795 B1 | 1/2005 | Takeda et al. |
| 6,956,355 B2 | 10/2005 | Vaillancourt et al. |
| 6,988,162 B2 | 1/2006 | Goergen |
| 6,991,467 B1 | 1/2006 | Cheng et al. |
| 7,114,070 B2 | 9/2006 | Willming et al. |
| 7,164,255 B2 | 1/2007 | Hui |
| 7,172,428 B2 | 2/2007 | Huang |
| 7,200,692 B2 | 4/2007 | Singla et al. |
| 7,234,963 B1 | 6/2007 | Huang |
| 7,254,452 B2 | 8/2007 | Davlin et al. |
| 7,399,209 B2 | 7/2008 | Kodaira |
| 7,402,074 B2 | 7/2008 | Leblanc et al. |
| 7,415,368 B2 | 8/2008 | Gilbert et al. |
| 7,426,585 B1 | 9/2008 | Rourke |
| 7,460,482 B2 | 12/2008 | Pike |
| 7,510,420 B2 | 3/2009 | Mori |
| 7,526,676 B2 | 4/2009 | Chou et al. |
| 7,529,862 B2 | 5/2009 | Isani et al. |
| 7,536,548 B1 | 5/2009 | Batke et al. |
| 7,554,288 B2 | 6/2009 | Gangstoe et al. |
| 7,587,481 B1 | 9/2009 | Osburn, III |
| 7,614,909 B2 | 11/2009 | Lin |
| 7,619,386 B2 | 11/2009 | Sasaki et al. |
| 7,622,994 B2 | 11/2009 | Galal |
| 7,660,998 B2 | 2/2010 | Walmsley |
| 7,670,190 B2 | 3/2010 | Shi et al. |
| 7,685,349 B2 | 3/2010 | Allen et al. |
| 7,730,304 B2 | 6/2010 | Katsube et al. |
| 7,746,846 B2 | 6/2010 | Boora et al. |
| 7,761,640 B2 | 7/2010 | Hikabe |
| 7,774,074 B2 | 8/2010 | Davlin et al. |
| 7,788,431 B2 | 8/2010 | Deshpande et al. |
| 7,790,304 B2 | 9/2010 | Hendricks et al. |
| 7,811,136 B1 | 10/2010 | Hsieh et al. |
| 7,815,471 B2 | 10/2010 | Wu |
| 7,822,994 B2 | 10/2010 | Hamaguchi |
| 7,839,025 B2 | 11/2010 | Besser et al. |
| 7,872,561 B2 | 1/2011 | Matumoto |
| 7,948,758 B2 | 5/2011 | Buhler et al. |
| 7,960,870 B2 | 6/2011 | Besser et al. |
| 7,971,052 B2 | 6/2011 | Lucas et al. |
| 8,013,474 B2 | 9/2011 | Besser et al. |
| 8,019,194 B2 | 9/2011 | Morrison et al. |
| 8,032,745 B2 | 10/2011 | Bandholz et al. |
| 8,062,070 B2 | 11/2011 | Jeon et al. |
| 8,125,208 B2 | 2/2012 | Gyland |
| 8,132,231 B2 | 3/2012 | Amies et al. |
| 8,143,858 B2 | 3/2012 | Tsugawa et al. |
| 8,149,587 B2 | 4/2012 | Baran et al. |
| 8,157,569 B1 | 4/2012 | Liu |

(56) References Cited

U.S. PATENT DOCUMENTS

| | | |
|---|---|---|
| 8,181,262 B2 | 5/2012 | Cooper et al. |
| 8,189,101 B2 | 5/2012 | Cummings et al. |
| 8,212,399 B2 | 7/2012 | Besser et al. |
| 8,266,360 B2 | 9/2012 | Agrawal |
| 8,281,386 B2 | 10/2012 | Milligan et al. |
| 8,287,306 B2 | 10/2012 | Daugherty et al. |
| 8,295,770 B2 | 10/2012 | Seil et al. |
| 8,310,380 B2 | 11/2012 | Aria et al. |
| 8,341,717 B1 | 12/2012 | Delker et al. |
| 8,380,905 B2 | 2/2013 | Djabbari et al. |
| 8,390,441 B2 | 3/2013 | Covaro et al. |
| 8,465,762 B2 | 6/2013 | Lee et al. |
| 8,480,438 B2 | 7/2013 | Mattson |
| 8,532,119 B2 | 9/2013 | Snively et al. |
| 8,560,147 B2 | 10/2013 | Taylor et al. |
| 8,587,318 B2 | 11/2013 | Chandler et al. |
| 8,651,874 B2 | 2/2014 | Ku et al. |
| 8,677,145 B2 | 3/2014 | Maletsky et al. |
| 8,694,770 B1 | 4/2014 | Osburn, III |
| 8,777,671 B2 | 7/2014 | Huang |
| 8,862,802 B2 | 10/2014 | Calvin et al. |
| 8,868,813 B2 | 10/2014 | Calvin et al. |
| 8,971,072 B2 | 3/2015 | Calvin et al. |
| 9,071,082 B2 | 6/2015 | Nishibayashi et al. |
| 9,318,917 B2 | 4/2016 | Kubota et al. |
| 9,436,641 B2 | 9/2016 | Calvin et al. |
| 9,465,762 B2 | 10/2016 | Calvin et al. |
| 9,467,297 B2 | 10/2016 | Clish et al. |
| 9,812,803 B2 | 11/2017 | Toyoda et al. |
| 9,843,149 B1 | 12/2017 | Irbe et al. |
| 10,103,875 B1 | 10/2018 | Roth et al. |
| 10,613,567 B2 | 4/2020 | Rooyakkers et al. |
| 10,832,861 B2 | 11/2020 | Rooyakkers et al. |
| 11,046,260 B2 | 6/2021 | Sekino et al. |
| 11,093,427 B2 | 8/2021 | Calvin et al. |
| 2002/0070835 A1 | 6/2002 | Dadafshar |
| 2002/0080828 A1 | 6/2002 | Ofek et al. |
| 2002/0080829 A1 | 6/2002 | Ofek et al. |
| 2002/0084698 A1 | 7/2002 | Kelly et al. |
| 2002/0086678 A1 | 7/2002 | Salokannel et al. |
| 2002/0095573 A1 | 7/2002 | O'Brien |
| 2002/0097031 A1 | 7/2002 | Cook et al. |
| 2002/0116619 A1 | 8/2002 | Maruyama et al. |
| 2002/0124198 A1 | 9/2002 | Bormann et al. |
| 2002/0171525 A1 | 11/2002 | Kobayashi et al. |
| 2002/0182898 A1 | 12/2002 | Takahashi et al. |
| 2002/0189910 A1 | 12/2002 | Yano et al. |
| 2003/0005289 A1 | 1/2003 | Gougeon et al. |
| 2003/0013727 A1 | 1/2003 | Maw et al. |
| 2003/0040897 A1 | 2/2003 | Murphy et al. |
| 2003/0074489 A1 | 4/2003 | Steger et al. |
| 2003/0094855 A1 | 5/2003 | Lohr et al. |
| 2003/0105601 A1 | 6/2003 | Kobayashi et al. |
| 2003/0137277 A1 | 7/2003 | Mori et al. |
| 2003/0166397 A1 | 9/2003 | Aura |
| 2003/0202330 A1 | 10/2003 | Lopata et al. |
| 2003/0204756 A1 | 10/2003 | Ransom et al. |
| 2003/0236998 A1 | 12/2003 | Gilstrap et al. |
| 2004/0178770 A1 | 9/2004 | Gagnon et al. |
| 2005/0001589 A1 | 1/2005 | Edington et al. |
| 2005/0019143 A1 | 1/2005 | Bishman |
| 2005/0091432 A1 | 4/2005 | Adams et al. |
| 2005/0102535 A1 | 5/2005 | Patrick et al. |
| 2005/0144437 A1 | 6/2005 | Ransom et al. |
| 2005/0144440 A1 | 6/2005 | Catherman et al. |
| 2005/0151720 A1 | 7/2005 | Cruz-Hernandez et al. |
| 2005/0162019 A1 | 7/2005 | Masciarelli et al. |
| 2005/0182876 A1 | 8/2005 | Kim et al. |
| 2005/0189910 A1 | 9/2005 | Hui |
| 2005/0198522 A1 | 9/2005 | Shaw et al. |
| 2005/0229004 A1 | 10/2005 | Callaghan |
| 2006/0015590 A1 | 1/2006 | Patil et al. |
| 2006/0020782 A1 | 1/2006 | Kakii |
| 2006/0108972 A1 | 5/2006 | Araya |
| 2006/0119315 A1 | 6/2006 | Sasaki et al. |
| 2006/0155990 A1 | 7/2006 | Katsube et al. |
| 2006/0156415 A1 | 7/2006 | Rubinstein et al. |
| 2007/0072442 A1 | 3/2007 | Difonzo et al. |
| 2007/0076768 A1 | 4/2007 | Chiesa et al. |
| 2007/0091886 A1 | 4/2007 | Davis et al. |
| 2007/0123304 A1 | 5/2007 | Pattenden et al. |
| 2007/0123316 A1 | 5/2007 | Little |
| 2007/0143838 A1 | 6/2007 | Milligan et al. |
| 2007/0174524 A1 | 7/2007 | Kato et al. |
| 2007/0177298 A1 | 8/2007 | Jaatinen et al. |
| 2007/0192134 A1 | 8/2007 | Littenberg et al. |
| 2007/0194944 A1 | 8/2007 | Galera et al. |
| 2007/0214296 A1 | 9/2007 | Takamatsu et al. |
| 2007/0229302 A1 | 10/2007 | Penick et al. |
| 2007/0260897 A1 | 11/2007 | Cochran et al. |
| 2007/0286234 A1 | 12/2007 | Gutman et al. |
| 2008/0067874 A1 | 3/2008 | Tseng |
| 2008/0077976 A1 | 3/2008 | Schulz |
| 2008/0080395 A1 | 4/2008 | Law et al. |
| 2008/0082449 A1 | 4/2008 | Wilkinson et al. |
| 2008/0123669 A1 | 5/2008 | Oliveti et al. |
| 2008/0140888 A1 | 6/2008 | Blair et al. |
| 2008/0181316 A1 | 7/2008 | Crawley et al. |
| 2008/0189441 A1 | 8/2008 | Jundt et al. |
| 2008/0194124 A1 | 8/2008 | Di Stefano |
| 2008/0209216 A1 | 8/2008 | Kelly et al. |
| 2008/0285755 A1 | 11/2008 | Camus et al. |
| 2008/0303351 A1 | 12/2008 | Jansen et al. |
| 2009/0036164 A1 | 2/2009 | Rowley |
| 2009/0061678 A1 | 3/2009 | Minoo et al. |
| 2009/0066291 A1 | 3/2009 | Tien et al. |
| 2009/0083843 A1 | 3/2009 | Wilkinson, Jr. et al. |
| 2009/0091513 A1 | 4/2009 | Kuhn |
| 2009/0092248 A1 | 4/2009 | Rawson |
| 2009/0121704 A1 | 5/2009 | Shibahara |
| 2009/0204458 A1 | 8/2009 | Wiese et al. |
| 2009/0217043 A1 | 8/2009 | Metke et al. |
| 2009/0222885 A1 | 9/2009 | Batke et al. |
| 2009/0234998 A1 | 9/2009 | Kuo |
| 2009/0239468 A1 | 9/2009 | He et al. |
| 2009/0245245 A1 | 10/2009 | Malwankar et al. |
| 2009/0254655 A1 | 10/2009 | Kidwell et al. |
| 2009/0256717 A1 | 10/2009 | Iwai |
| 2009/0278509 A1 | 11/2009 | Boyles et al. |
| 2009/0287321 A1 | 11/2009 | Lucas et al. |
| 2009/0288732 A1 | 11/2009 | Gielen |
| 2010/0052428 A1 | 3/2010 | Imamura et al. |
| 2010/0066340 A1 | 3/2010 | Delforge |
| 2010/0082869 A1 | 4/2010 | Lloyd et al. |
| 2010/0122081 A1 | 5/2010 | Sato et al. |
| 2010/0148721 A1 | 6/2010 | Little |
| 2010/0149997 A1 | 6/2010 | Law et al. |
| 2010/0151816 A1 | 6/2010 | Besehanic et al. |
| 2010/0153751 A1 | 6/2010 | Tseng et al. |
| 2010/0197366 A1 | 8/2010 | Pattenden et al. |
| 2010/0197367 A1 | 8/2010 | Pattenden et al. |
| 2010/0233889 A1 | 9/2010 | Kiani et al. |
| 2010/0262312 A1 | 10/2010 | Kubota et al. |
| 2011/0010016 A1 | 1/2011 | Giroti |
| 2011/0038114 A1 | 2/2011 | Pance et al. |
| 2011/0057291 A1 | 3/2011 | Slupsky et al. |
| 2011/0066309 A1 | 3/2011 | Matsuoka et al. |
| 2011/0074349 A1 | 3/2011 | Ghovanloo |
| 2011/0080056 A1 | 4/2011 | Low et al. |
| 2011/0082621 A1 | 4/2011 | Berkobin et al. |
| 2011/0089900 A1 | 4/2011 | Hogari |
| 2011/0140538 A1 | 6/2011 | Jung et al. |
| 2011/0150431 A1 | 6/2011 | Klappert |
| 2011/0172940 A1 | 7/2011 | Wood et al. |
| 2011/0185196 A1 | 7/2011 | Asano et al. |
| 2011/0196997 A1 | 8/2011 | Ruberg et al. |
| 2011/0197009 A1 | 8/2011 | Agrawal |
| 2011/0202992 A1 | 8/2011 | Xiao et al. |
| 2011/0285847 A1 | 11/2011 | Riedel et al. |
| 2011/0291491 A1 | 12/2011 | Lemmens et al. |
| 2011/0296066 A1 | 12/2011 | Xia |
| 2011/0313547 A1 | 12/2011 | Hernandez et al. |
| 2012/0028498 A1 | 2/2012 | Na et al. |
| 2012/0036364 A1 | 2/2012 | Yoneda et al. |

(56) References Cited

U.S. PATENT DOCUMENTS

| | | |
|---|---|---|
| 2012/0046015 A1 | 2/2012 | Little |
| 2012/0053742 A1 | 3/2012 | Tsuda |
| 2012/0102334 A1 | 4/2012 | O'Loughlin et al. |
| 2012/0124373 A1 | 5/2012 | Dangoor et al. |
| 2012/0143586 A1 | 6/2012 | Vetter et al. |
| 2012/0159210 A1 | 6/2012 | Hosaka |
| 2012/0204033 A1 | 8/2012 | Etchegoyen et al. |
| 2012/0236769 A1 | 9/2012 | Powell et al. |
| 2012/0242459 A1 | 9/2012 | Lambert |
| 2012/0265361 A1 | 10/2012 | Billingsley et al. |
| 2012/0271576 A1 | 10/2012 | Kamel et al. |
| 2012/0274273 A1 | 11/2012 | Jacobs et al. |
| 2012/0282805 A1 | 11/2012 | Ku et al. |
| 2012/0284354 A1 | 11/2012 | Mukundan et al. |
| 2012/0284514 A1 | 11/2012 | Lambert |
| 2012/0295451 A1 | 11/2012 | Hyun-Jun et al. |
| 2012/0297101 A1 | 11/2012 | Neupaertl et al. |
| 2012/0311071 A1 | 12/2012 | Karaffa et al. |
| 2012/0322513 A1 | 12/2012 | Pattenden et al. |
| 2012/0328094 A1 | 12/2012 | Pattenden et al. |
| 2013/0011719 A1 | 1/2013 | Yasui et al. |
| 2013/0026973 A1 | 1/2013 | Luke et al. |
| 2013/0031382 A1 | 1/2013 | Jau et al. |
| 2013/0070788 A1 | 3/2013 | Deiretsbacher et al. |
| 2013/0082641 A1 | 4/2013 | Nishibayashi et al. |
| 2013/0170258 A1 | 7/2013 | Calvin et al. |
| 2013/0173832 A1 | 7/2013 | Calvin et al. |
| 2013/0211547 A1 | 8/2013 | Buchdunger et al. |
| 2013/0212390 A1 | 8/2013 | Du et al. |
| 2013/0224048 A1 | 8/2013 | Gillingwater et al. |
| 2013/0233924 A1 | 9/2013 | Burns |
| 2013/0244062 A1 | 9/2013 | Teramoto et al. |
| 2013/0290706 A1 | 10/2013 | Socky et al. |
| 2013/0291085 A1 | 10/2013 | Chong et al. |
| 2014/0015488 A1 | 1/2014 | Despesse |
| 2014/0068712 A1 | 3/2014 | Frenkel et al. |
| 2014/0075186 A1 | 3/2014 | Austen |
| 2014/0089692 A1 | 3/2014 | Hanafusa |
| 2014/0091623 A1 | 4/2014 | Shippy et al. |
| 2014/0095867 A1 | 4/2014 | Smith et al. |
| 2014/0097672 A1 | 4/2014 | Takemura et al. |
| 2014/0129162 A1 | 5/2014 | Hallman et al. |
| 2014/0131450 A1 | 5/2014 | Gordon et al. |
| 2014/0142725 A1 | 5/2014 | Boyd |
| 2014/0280520 A1 | 9/2014 | Baier et al. |
| 2014/0285318 A1 | 9/2014 | Audéon et al. |
| 2014/0312913 A1 | 10/2014 | Kikuchi et al. |
| 2014/0327318 A1 | 11/2014 | Calvin et al. |
| 2014/0335703 A1 | 11/2014 | Calvin et al. |
| 2014/0341220 A1 | 11/2014 | Lessmann |
| 2015/0019790 A1 | 1/2015 | Calvin et al. |
| 2015/0046701 A1 | 2/2015 | Rooyakkers et al. |
| 2015/0048684 A1 | 2/2015 | Rooyakkers et al. |
| 2015/0115711 A1 | 4/2015 | Kouroussis et al. |
| 2015/0303729 A1 | 10/2015 | Kasai et al. |
| 2015/0365240 A1 | 12/2015 | Callaghan |
| 2016/0036098 A1 | 2/2016 | Washiro |
| 2016/0065656 A1 | 3/2016 | Patin et al. |
| 2016/0069174 A1 | 3/2016 | Cannan et al. |
| 2016/0141894 A1 | 5/2016 | Beaston |
| 2016/0172635 A1 | 6/2016 | Stimm et al. |
| 2016/0224048 A1 | 8/2016 | Rooyakkers et al. |
| 2016/0301695 A1 | 10/2016 | Trivelpiece et al. |
| 2020/0310480 A1 | 10/2020 | Rooyakkers et al. |
| 2021/0109161 A1 | 4/2021 | Huot-Marchand et al. |

FOREIGN PATENT DOCUMENTS

| | | |
|---|---|---|
| CN | 1440254 A | 9/2003 |
| CN | 2596617 | 12/2003 |
| CN | 1571335 A | 1/2005 |
| CN | 1702582 A | 11/2005 |
| CN | 1839581 A | 9/2006 |
| CN | 1864305 A | 11/2006 |
| CN | 2899151 | 5/2007 |
| CN | 101005359 A | 7/2007 |
| CN | 101069407 A | 11/2007 |
| CN | 101262401 A | 9/2008 |
| CN | 101322089 A | 12/2008 |
| CN | 101349916 A | 1/2009 |
| CN | 101447861 A | 6/2009 |
| CN | 101533380 A | 9/2009 |
| CN | 101576041 A | 11/2009 |
| CN | 201515041 U | 6/2010 |
| CN | 101809557 A | 8/2010 |
| CN | 201590580 U | 9/2010 |
| CN | 101919139 A | 12/2010 |
| CN | 101977104 A | 2/2011 |
| CN | 102025500 A | 4/2011 |
| CN | 102035220 A | 4/2011 |
| CN | 102123031 A | 7/2011 |
| CN | 102236329 A | 11/2011 |
| CN | 102237680 A | 11/2011 |
| CN | 202205977 U | 4/2012 |
| CN | 102480352 A | 5/2012 |
| CN | 1934766 B | 6/2012 |
| CN | 102546707 A | 7/2012 |
| CN | 102809950 A | 12/2012 |
| CN | 102812578 A | 12/2012 |
| CN | 103064032 A | 4/2013 |
| CN | 203180248 U | 9/2013 |
| CN | 103376766 A | 10/2013 |
| CN | 103682481 A | 3/2014 |
| CN | 103682883 A | 3/2014 |
| CN | 103701919 A | 4/2014 |
| CN | 203645015 U | 6/2014 |
| CN | 104025387 A | 9/2014 |
| CN | 104155949 A | 11/2014 |
| CN | 203932181 U | 11/2014 |
| CN | 104185969 A | 12/2014 |
| CN | 104252163 A | 12/2014 |
| CN | 104297691 A | 1/2015 |
| CN | 104505894 A | 4/2015 |
| CN | 204243110 U | 4/2015 |
| CN | 105278327 A | 1/2016 |
| CN | 105556762 A | 5/2016 |
| CN | 104025387 B | 7/2018 |
| DE | 102013213550 | 1/2015 |
| EP | 0473336 | 3/1992 |
| EP | 0507360 | 10/1992 |
| EP | 1176616 A2 | 1/2002 |
| EP | 1241800 A1 | 9/2002 |
| EP | 1246563 A1 | 10/2002 |
| EP | 1571559 A1 | 9/2005 |
| EP | 1877915 A2 | 1/2008 |
| EP | 1885085 A1 | 2/2008 |
| EP | 2179364 A2 | 4/2010 |
| EP | 2317743 A1 | 5/2011 |
| EP | 2450921 A1 | 5/2012 |
| EP | 1396065 B1 | 7/2012 |
| EP | 2557657 A2 | 2/2013 |
| EP | 2557670 A2 | 2/2013 |
| EP | 1885085 B1 | 3/2013 |
| EP | 2613421 A1 | 7/2013 |
| EP | 2777796 A1 | 9/2014 |
| EP | 2806319 A2 | 11/2014 |
| EP | 2966806 A1 | 1/2016 |
| JP | S5974413 U | 5/1984 |
| JP | S59177226 U | 11/1984 |
| JP | H0163190 U | 4/1989 |
| JP | H02164012 A | 6/1990 |
| JP | H04153705 A | 5/1992 |
| JP | H04245411 A | 9/1992 |
| JP | H05346809 A | 12/1993 |
| JP | 07075143 | 3/1995 |
| JP | H0794354 A | 4/1995 |
| JP | H07105328 A | 4/1995 |
| JP | H07320963 A | 12/1995 |
| JP | H0837121 A | 2/1996 |
| JP | H0898274 A | 4/1996 |
| JP | H08241824 A | 9/1996 |
| JP | H08322252 A | 12/1996 |
| JP | H09182324 A | 7/1997 |
| JP | H09213548 A | 8/1997 |

(56) References Cited

FOREIGN PATENT DOCUMENTS

| | | |
|---|---|---|
| JP | H1189103 A | 3/1999 |
| JP | H1198215 A | 4/1999 |
| JP | H1198707 A | 4/1999 |
| JP | H11230504 A | 8/1999 |
| JP | H11235044 A | 8/1999 |
| JP | H11312013 A | 11/1999 |
| JP | 2000041068 A | 2/2000 |
| JP | 2000124890 A | 4/2000 |
| JP | 2000252143 A | 9/2000 |
| JP | 2001100809 A | 4/2001 |
| JP | 2001242971 A | 9/2001 |
| JP | 2001292176 A | 10/2001 |
| JP | 2001307055 A | 11/2001 |
| JP | 2002134071 A | 5/2002 |
| JP | 2002280238 A | 9/2002 |
| JP | 2002343655 A | 11/2002 |
| JP | 2002359131 A | 12/2002 |
| JP | 3370931 B2 | 1/2003 |
| JP | 2003047912 A | 2/2003 |
| JP | 2003068543 A | 3/2003 |
| JP | 2003142327 A | 5/2003 |
| JP | 2003152703 A | 5/2003 |
| JP | 2003152708 A | 5/2003 |
| JP | 2003216237 A | 7/2003 |
| JP | 2004501540 A | 1/2004 |
| JP | 2004303701 A | 10/2004 |
| JP | 2004532596 A | 10/2004 |
| JP | 2005020759 A | 1/2005 |
| JP | 2005038411 A | 2/2005 |
| JP | 2005513956 A | 5/2005 |
| JP | 2005151720 A | 6/2005 |
| JP | 2005250833 A | 9/2005 |
| JP | 2005275777 A | 10/2005 |
| JP | 2005531235 A | 10/2005 |
| JP | 2005327231 A | 11/2005 |
| JP | 2005332406 A | 12/2005 |
| JP | 2006060779 A | 3/2006 |
| JP | 2006164706 A | 6/2006 |
| JP | 2006180460 A | 7/2006 |
| JP | 2006223950 A | 8/2006 |
| JP | 2006238274 A | 9/2006 |
| JP | 2006254650 A | 9/2006 |
| JP | 2007034711 A | 2/2007 |
| JP | 2007096817 A | 4/2007 |
| JP | 2007519150 A | 7/2007 |
| JP | 2007238696 A | 9/2007 |
| JP | 2007252081 A | 9/2007 |
| JP | 2007535235 A | 11/2007 |
| JP | 2008008861 A | 1/2008 |
| JP | 2008172873 A | 7/2008 |
| JP | 2008215028 A | 9/2008 |
| JP | 2008257707 A | 10/2008 |
| JP | 2008538668 A | 10/2008 |
| JP | 4245411 B2 | 3/2009 |
| JP | 2009054086 A | 3/2009 |
| JP | 2009065759 A | 3/2009 |
| JP | 2009157913 A | 7/2009 |
| JP | 2009163909 A | 7/2009 |
| JP | 2009538112 A | 10/2009 |
| JP | 2010011351 A | 1/2010 |
| JP | 2010503134 A | 1/2010 |
| JP | 4439340 B2 | 3/2010 |
| JP | 2010515407 A | 5/2010 |
| JP | 2010135903 A | 6/2010 |
| JP | 2010205163 A | 9/2010 |
| JP | 2010233167 A | 10/2010 |
| JP | 2010533387 A | 10/2010 |
| JP | 2011078249 A | 4/2011 |
| JP | 2011217037 A | 10/2011 |
| JP | 2011223544 A | 11/2011 |
| JP | 2012033491 A | 2/2012 |
| JP | 5013019 B1 | 8/2012 |
| JP | 2012190583 A | 10/2012 |
| JP | 2012195259 A | 10/2012 |
| JP | 2013021798 A | 1/2013 |
| JP | 2013031358 A | 2/2013 |
| JP | 2013153596 A | 8/2013 |
| JP | 2013170258 A | 9/2013 |
| JP | 2013192389 A | 9/2013 |
| JP | 5362930 B1 | 12/2013 |
| JP | 2014507721 A | 3/2014 |
| JP | 2014080952 A | 5/2014 |
| JP | 2015023375 A | 2/2015 |
| JP | 2016021763 A | 2/2016 |
| JP | 2016512039 A | 4/2016 |
| JP | 2016149128 A | 8/2016 |
| JP | 2016527844 A | 9/2016 |
| JP | 6189479 B1 | 8/2017 |
| JP | 2019146257 A | 8/2019 |
| JP | 2020115457 A | 7/2020 |
| KR | 20020088540 A | 11/2002 |
| KR | 20050014790 A | 2/2005 |
| KR | 20060034244 A | 4/2006 |
| KR | 100705380 B1 | 4/2007 |
| KR | 100807377 B1 | 2/2008 |
| KR | 20130039174 A | 4/2013 |
| TW | 201310344 A | 3/2013 |
| WO | 0180442 A2 | 10/2001 |
| WO | 02097946 A2 | 12/2002 |
| WO | 2005070733 A1 | 8/2005 |
| WO | 2005081659 A2 | 9/2005 |
| WO | 2006059195 A1 | 6/2006 |
| WO | 2007041866 A1 | 4/2007 |
| WO | 2007148462 A1 | 12/2007 |
| WO | 2008083387 A2 | 7/2008 |
| WO | 2009032797 A2 | 3/2009 |
| WO | 2009142053 A1 | 11/2009 |
| WO | 2010117082 A1 | 10/2010 |
| WO | 2011104935 A1 | 9/2011 |
| WO | 2013031124 A1 | 3/2013 |
| WO | 2013033247 A1 | 3/2013 |
| WO | 2013102069 A1 | 7/2013 |
| WO | 2014061307 A1 | 4/2014 |
| WO | 2014147896 A1 | 9/2014 |
| WO | 2014179556 A1 | 11/2014 |
| WO | 2014179566 A1 | 11/2014 |
| WO | 2015020633 A1 | 2/2015 |

OTHER PUBLICATIONS

Extended European Search Report for European Patent Application No. EP 14196409 Mailed on May 31, 2016, 10pages.

Extended European Search Report for European Patent Application No. EP 16154943 Mailed on Jun. 29, 2016, 9pages.

Extended European Search Report for European Patent Application No. EP 17178867 Mailed on Nov. 2, 2017, 13pages.

Extended European Search Report for European Patent Application No. EP 18176358 Mailed on Sep. 11, 2018, 11 pages.

Extended European Search Report in European Application No. 17208183.8, dated Jun. 22, 2018.

Extended European Search Reported for European Application No. 20201403.1, dated Apr. 29, 2021.

Extended Search Report for European Application No. 14180106.8, dated Jul. 13, 2015.

Extented European search report for European Patent Application No. EP16165112 dated Sep. 6, 2016, 12 pages.

Fabien F., "Raspberry Pi + Mihini, Controlling an off-the-grid Electrical Installation, Part I," Apr. 11, 2014, XP055290314.

Fang et al., "Application of expert diagnosis system in rechargeable battery," Department of Computer Science, Qinghua University, Beijing, China, vol. 26, No. 3, Jun. 2002.

Final Decision for Rejection for Patent Application No. 2016-021763, dated Jul. 31, 2020.

Final Decision of Rejection and Decision of Dismissal of Amendment for Japanese Application No. 2016-080207, dated Sep. 10, 2021.

Generex System Gmbh, "BACS—Battery Analysis Care System," Aug. 17, 2014 , XP055290320, Retrieved from the Internet: URL :HTTP://web.archive.org/we/2040929060116/ http://www.generex.de/generex/download/datasheets/datasheet_BACS_C20_de.pdf.

(56) References Cited

OTHER PUBLICATIONS

Generex Systems GMBH, "SACS—Battery Analysis Care System," Aug. 17, 2014, XP055290320.
Hosseinabady, Mohammad, et al., "Using the inter- and intra-switch regularity in NoC switch testing," Design, Automation & Test in Europe Conference Exhibition: Nice, France, Apr. 16-20, 2007, IEEE Service Center, Apr. 16, 2007 (XP058290046).
International Search Report and Written Opinion dated May 12, 2014 in International Application# PCT/US2013/053721.
International Search Report and Written Opinion for PCT/US2014/036368, dated Sep. 12, 2014.
International Search Report and Written Opinion of the International Searching Authority Dated Apr. 29, 2013, International Application No. PCT/US2012/072056.
International Search Report for Application No. PCT/US2013/053721 mailed May 12, 2014.
"Introduction to Cryptography," NetWOrk Associates, Inc., PGP 6.5.1, 1990-1999, Retrieved@ [ftp://!ftp.pgpi.org/pub/pgp/6.5/docs/english/IntroToCrypto.pdf] on Mar. 17, 2016, (refer to pp. 16-20).
Japanese Office Action for Application No. JP2014-550508 dated Sep. 15, 2017.
Keith S., et al. "Guide to Industrial Control Systems (ICS) Security," NIST, Special Publication 800-882, Jun. 2011, (refer to pp. 2-1 to 2-10).
Luo, X., Ji, X. and Park, M.S., Apr. 2010. Location privacy against traffic analysis attacks in wireless sensor networks. In 2010 International Conference on Information Science and Applications (pp. 1-6). IEEE. (Year: 2010).
Molva, R. Ed et al., "Internet security architecture", Computer Networks, Elsevier Science Publishers B. V., Amsterdam, NL, vol. 31, No. 8, Apr. 23, 1999, pp. 787-804, XP004304518.
Notice of Final Rejection for Korean Application No. 10-2016-0045717, dated Oct. 17, 2023.
Notice of Preliminary Rejection for Korean Application No. 10-2016-0015889, dated Jul. 6, 2022.
Notice of Preliminary Rejection for Korean Application No. 10-2016-0045717, dated Apr. 18, 2023.
Notice of Reason for Rejection for Japanese Application No. 2016-080207, dated Feb. 4, 2021.
Notice of Reason for Rejection for Japanese Application No. 2016-080207, dated Jun. 4, 2020.
Notice of Reason for Rejection for Japanese Application No. 2014-243827, dated Feb. 1, 2021.
Notice of Reason for Rejection for Japanese Application No. 2014-243827, dated Jan. 24, 2019.
Notice of Reason for Rejection for Japanese Patent Application No. 2014-243830, dated Jul. 10, 2019.
Notice of Reason for Rejection for Japanese Patent Application No. 2014-243830, dated Sep. 21, 2018.
Notice of Reason for Rejection for JP Patent Application No. 2018-109151, dated Jun. 25, 2019.
Notice of Reason for Rejection for Patent Application No. 2016-021763, dated Nov. 27, 2019.
Notice of Reason for Rejection for Patent Application No. 2022-002389, dated Mar. 17, 2023.
Notice of Reason for Rejection for Patent Application No. 2022-002389, dated Nov. 25, 2022.
Notice of Reasons for Rejection dated Jul. 13, 2017 for Japanese Application No. JP2016-533279.
Notice of Reasons for Rejection dated Mar. 1, 2018 for Japanese Application No. JP2016-533279.
Notice of Reasons for Rejection for Japanese Application No. 2022-092303, dated Aug. 31, 2023.
Notice of Reasons for Rejection for Japanese Patent Application No. 2020-035778, dated Apr. 15, 2021.
Notice of Reasons for Rejection for Japanese Patent Application No. 2021-148592, dated Oct. 28, 2022.
Notification of the Second Office Action for Chinese Application No. 201380079514.4, dated Nov. 5, 2018.
Office Action dated Dec. 2, 2016 for JP Application No. 2014-550508.
Office Action dated Feb. 5, 2018 for Chinese Application No. CN201380079514.4.
Office Action for Canadian Application No. 2,875,515 dated Feb. 17, 2016.
Office Action for Canadian Application No. 2,875,515, dated Jun. 1, 2016.
Office Action for Canadian Application No. 2,875,515, dated Oct. 6, 2016.
Baran, M. et al., "Overcurrent Protection on Voltage-Source-Converter-Based Multiterminal DC Distribution Systems," IEEE Transactions on Power Delivery, vol. 22, No. 1, Jan. 2007, pp. 406-412.
Canadian Office Action for Application No. 2920133 dated Jan. 30, 2017.
Canadian Office Action for Application No. 2920133 dated Oct. 19, 2016.
CGI, White Paper on "Public Key Encryption and Digital Signature: How do they work?", 2004 (refer to pp. 3-4).
Chen, et al., "Active Diagnosability of Discrete Event Systems and its Application to Battery Fault Diagnosis," IEEE Transactions on Control Systems Technology, vol. 22, No. 5, Sep. 2014.
Chinese Office Action for Application No. 201380079515.9 dated Aug. 7, 2018.
Chinese Office Action for Application No. 201380079515.9 dated Nov. 16, 2017.
Chinese Office Action for Application No. 202010105899.9, dated Dec. 3, 2020.
Chinese Office Action for Application No. CN201610239130.X dated Aug. 2, 2017.
Chinese Office Action for Application No. CN201610239130.X dated Feb. 14, 2018.
Chinese Office Action for Application No. 201410383686.7 dated May 31, 2017.
Chinese Office Action for Application No. 201410799473.2, dated Oct. 12, 2018.
Chinese Office Action for Application No. CN201410182071.8 dated Mar. 1, 2017.
D. Dzung, M. Naedele, T. P. Von Hoff and M. Crevatin, "Security for Industrial Communication Systems," in Proceedings of the IEEE, vol. 93, No. 6, pp. 1152-1177, Jun. 2005, doi: 10.11 09/JPROC.2005.849714. (Year: 2005).
Decision for Rejection for Japanese Application No. 2021-160356, dated Jun. 22, 2023.
Decision of Dismissal of Amendment for Japanese Application 2021-117572, dated May 12, 2023.
Decision of Reexamination of Chinese Application No. 201711349441.2, dated May 23, 2023.
Decision of Rejection for Chinese Application No. 201711349441.2, dated Jun. 23, 2022.
Decision of Rejection for Japanese Application No. 2014-243830, dated Mar. 18, 2020.
Decision of Rejection for Japanese Application No. 2021-148592, dated May 10, 2023.
Decision of Rejection for Japanese Patent Application No. 2021-112729, dated Feb. 6, 2023.
Decision of Rejection for Patent Application No. 2014-243827, dated Nov. 28, 2019.
Decisionof Rejection for Chinese Application No. 2015103905202.2, dated Nov. 5, 2019.
Emerson Process Management, "DeltaV Digital Automation System—System Overview," XP055402326, Jan. 1, 2009, pp. 1-40.
European Examination Report for Application No. 14196406.4, dated May 12, 2020.
European Search Report dated Dec. 2, 2015 for EP Application No. 14196408.0.
European Search Report for Application No. 20173319.3, dated Nov. 24, 2020.
European Search Report for EP Application No. 14196408.0, dated Nov. 24, 2015.
European Search Report for European Application No. 14196406.4, dated Sep. 23, 2015.

(56) References Cited

OTHER PUBLICATIONS

European search report for European Patent Application No. EP14196406 dated Oct. 2, 2015, 6 pages.
European Search Report in Application No. 12862174.5, dated Feb. 15, 2016.
European Search Report published Nov. 4, 2015 in Application No. EP14196406.4.
Examination Report for Application No. EP20201403.1, dated Aug. 10, 2023.
Examination Report for European Application No. 14180106.8, dated Jun. 28, 2017.
Examination Report for European Application No. 14196406.4, dated Mar. 31, 2021.
Examination Report for European Application No. 17178867.2, dated Mar. 13, 2019.
Examination Report for European Application No. 21187809.5, dated Jan. 3, 2023.
Examination Report for European Application No. 13891327.2, dated Sep. 26, 2018.
Examination Report for European Application No. 16165112.0, dated Apr. 17, 2019.
Examination Report for European Application No. 16165112.0, dated Feb. 16, 2018 .
Examination Report for European Patent Application No. 16154943.1, dated May 16, 2019.
Examination Report for European Patent Application No. 1720883.8, dated Oct. 29, 2019.
Examination Report in European Application No. 17208183.8, dated Feb. 27, 2019.
Extended European Search Report for 21187809.5, dated Nov. 29, 2021.
Extended European Search Report for Application No. 22206775.3, dated May 2, 2023.
Extended European Search Report for Application No. EP14180106.8, mailed on Aug. 12, 2015.
Extended European Search Report for European Application No. 20150993.2, dated Apr. 29, 2020.
Extended European Search Report for European Application No. 20201408.0, dated Apr. 7, 2021.
Extended European Search Report for European Application No. 22206775.3, dated May 5, 2023.
Office Action for Canadian Application No. 2,875,518, dated Apr. 22, 2016.
Office Action for Canadian Application No. 2,875,518, dated Jun. 3, 2015.
Office Action for Canadian Application No. 2,920,133, dated Apr. 14, 2016.
Office Action for Canadian Application No. 2,920,133, dated Jan. 30, 2017.
Office Action for Canadian Application No. 2,920,133, dated Oct. 19, 2016.
Office Action for Canadian Application No. 2,875,515 dated Feb. 10, 2017 .
Office Action for Canadian Application No. 2,875,515 dated Jul. 5, 2017 .
Office Action for Candian Application No. 2,875,517 dated May 4, 2015.
Office Action for Chinese Application No. 201280065564.2, dated Aug. 3, 2016.
Office Action for Chinese Application No. 201280065564.2 dated Oct. 19, 2017.
Office Action for Chinese Application No. 201410383686.7, dated Feb. 23, 2018.
Office Action for Chinese Application No. 20141079995.2, dated Jul. 3, 2019.
Office Action for Chinese Application No. 201480034066.0, dated May 3, 2017.
Office Action for Chinese Application No. 2015103905202.2, dated Jun. 20, 2018.
Office Action for Chinese Application No. 2015103905202.2, dated Mar. 6, 2019.
Office Action for Chinese Application No. 2015103905202.2, datedAugust 6, 2019.
Office Action for Chinese Application No. 201610229230.4, dated Mar. 18, 2021.
Office Action for Chinese Application No. 201711349441.2, dated May 27, 2021.
Office Action for Chinese Application No. 201910660260.4, dated Nov. 18, 2021.
Office Action for Chinese Application No. 2020101058999, dated Sep. 3, 2021.
Office Action for Chinese Application No. 201410802889.5 dated Jul. 26, 2018.
Office Action for Chinese AppIn No. 201380079515.9, dated Feb. 25, 2019.
Office Action for Chinese Patent Application 201410802889.5, dated May 7, 2019.
Office Action for Chinese Patent Application No. 201610236358.3, dated Jan. 25, 2021.
Office Action for Chinese Patent Application No. 201610236358.3, dated Jun. 24, 2020.
Office Action for Chinese Patent Application No. 201610236358.3, dated Sep. 4, 2019.
Office Action for Chinese Patent Application No. 201711349441.2, dated Mar. 20, 2023.
Office Action for EP Application No. 14196409.8 dated Jan. 22, 2018.
Office Action for Japanese Application No. 2014-080952, dated Jan. 7, 2019.
Office Action for Japanese Application No. 2014-080952, dated May 2, 2018.
Office Action for Japanese Application No. 2014-159475, dated Feb. 15, 2019.
Office Action for Japanese Application No. 2014-159475, dated Jun. 11, 2018.
Office Action for Japanese Application No. 2014-243830, dated Jun. 29, 2021.
Office Action for Japanese Application No. 2016-021763, dated Jun. 11, 2021.
Office Action for Japanese Application No. 2016-512039, dated Feb. 5, 2019.
Office Action for Japanese Application No. 2016-512039, dated Jun. 5, 2018.
Office Action for Japanese Application No. 2016-533280, dated Apr. 11, 2018.
Office Action for Japanese Application No. 2016-533280, dated Jan. 7, 2019.
Office Action for Japanese Application No. 2016-533280, dated Jun. 29, 2020.
Office Action for Japanese Application No. 2017-237592, dated Dec. 27, 2021.
Office Action for Japanese Application No. 2020-135564, dated Jul. 20, 2021.
Office Action for Japanese Application No. 2020-135564, dated Mar. 8, 2022.
Office Action for Japanese Application No. 2020-135564, dated Sep. 14, 2022.
Office Action for Japanese Application No. 2021-112729, dated Jun. 27, 2022.
Office Action for Japanese Application No. 2021-117572, dated Oct. 14, 2022.
Office Action for Japanese Application No. 2016-533280, dated Jun. 28, 2017.
Office Action forChinese Patent Application 201410802889.5, dated Dec. 4, 2019.
Office Action from Chinese Patent Application No. 201610229230.4, dated Jul. 15, 2020.
Office Action from Chinese Patent Application No. 201610229230.4, dated Oct. 24, 2019.
Office Action from EP Application No. 14196406.4, dated Jul. 29, 2019.

(56) References Cited

OTHER PUBLICATIONS

Office Action in Japan for Application No. 2021-160356, dated Dec. 16, 2022.
Office Action for Chinese Application No. 201280065564.2, dated Feb. 28, 2017.
Office Action for Japanese Application No. 2015-136186, dated October 10, 2019.
Partial European Search Report for European Patent Application No. EP 15175744 Mailed on Jan. 4, 2016, 7 pages.
Partial European Search Report in European Application No. 17208183.8, dated Mar. 28, 2018.
Partial Search Report for European Application No. 15175744.0, dated Dec. 14, 2015.
Partial Supplementary European Search Report dated Nov. 10, 2015 in Application# EP12862174.5.
Partial Supplementary European Search Report in Application No. 12862174.5, dated Nov. 3, 2015.
Reason for Rejection for Japanese Application No. 2015-136186, dated May 7, 2020.
Reason for Rejection for Japanese Application No. 2020-061935, dated Mar. 31, 2021.
Reason for Rejection in Japanese Patent Application No. 2016-533279, dated Aug. 13, 2018.
Reasons for Rejection for Japanese Application No. 2021-138773, dated Jun. 29, 2022.
Rodrigues A., "Scada Security Device: Design and Implementation", Master of Science Thesis, Wichita State University, Dec. 2011.
Rodrigues, A., et al., "SCADA security device", Proceedings of the Seventh Annual Workshop on Cyber Security and Information Intelligence Research, CSIIRW '11, Jan. 1, 2011, p. 1, XP055230335, New York, New York, USA.
Roman Kleinerman, Daniel Feldman (May 2011), Power over Ethernet (POE): An Energy-Efficient Alternative (PDF), Marvell, retrieved Sep. 25, 2018 @ http://www.marvell.com/switching/assets/Marveii-PoE-An-Energy-Efficient-Alternative.pdf (Year: 2011).
Search Report for European Application No. 14196406.4, dated Nov. 4, 2015.
Search Report for European Application No. 14196409.8, dated May 19, 2016.
Search Report for European Application No. 15175744.0, dated Apr. 26, 2016.
Search Report for European Application No. 16154943.1 dated Jun. 17, 2016.
Seimens AG, "ERTEC400—Enhanced Real-Time Ethernet Controller—Handbuch," XP002637652, Version 1.2.2, Jul. 31, 2010, pp. 1-98.
Shrnatikov, V. and Wang, M. H. Timing Analysis in Low-Latency Mix Networks: Attacks and Defenses. In ESORICS 2006, pp. 18-33 . (Year: 2006).
Siemens AG: "ERTEC 400 | Enhanced Real-Time Ethernet Controller | Handbuch",No. Version 1.2.2 pp. 1-98, XP002637652, Retrieved from the Internet: URL: http:llcache.automation.siemens.comldniiDUIDUxNDgzNwAA_21631481_HBIERTEC400_Handbuch_V122.pdf [retrieved on Feb. 5, 2011].
Siemens, "Uninterruptible 24 V DC Power Supply High-Performance, communicative and integrated in TIA," Mar. 31, 2015,XP055290324.
Summons to attend oral proceedings for European Application No. 14196409.8, dated Nov. 13, 2019.
Supplementary European Search Report for European Patent Application No. EP 13890953 Mailed on Feb. 6, 2017, 9 pages.
Supplementary European Search Report for European Patent Application No. EP 14791210 Mailed on Dec. 16, 2016, 11 pages.
Supplementary Search Report for European Application No. 13890953.6 dated Jan. 26, 2017.
Supplementary Search Report for European Application No. 13891327.2, dated Jan. 10, 2017.
Supplementary Search Report for European Application No. 14791210.9, dated Dec. 6, 2016.
Zafirovic-Vukotic, M. et al., "Secure SCADA network supporting NERC CIP", Power & Energy Society General Meeting, 2009, PES '09, IEEE, Piscataway, NJ, USA, Jul. 26, 2009, pp. 1-8, XP031538542.
Office Action from Japanese Application No. 2022-092303, dated Apr. 25, 2024.
Notification of the First Office Action in China for Application No. 202111053712.6, dated Jul. 17, 2024.
First Office Action in China for Application No. 202111391509.X, dated Jul. 25, 2024.
Communication pursuant to Article 94(3) EPC in Europe for Application No. 20173319.3, dated Aug. 30, 2024.

OPERATOR ACTION AUTHENTICATION IN AN INDUSTRIAL CONTROL SYSTEM

CROSS-REFERENCE TO RELATED APPLICATIONS

The present application is a continuation application under 35 U.S.C. § 120 of U.S. patent application Ser. No. 17/093,950, filed Nov. 10, 2020, and titled "AUTHENTICATION BETWEEN INDUSTRIAL ELEMENTS IN AN INDUSTRIAL CONTROL SYSTEM," which is a continuation application under 35 U.S.C. § 120 of U.S. patent application Ser. No. 14/519,066, filed Oct. 20, 2014, and titled "AUTHENTICATION BETWEEN INDUSTRIAL ELEMENTS IN AN INDUSTRIAL CONTROL SYSTEM" (now issued as U.S. Pat. No. 10,834,094). The present application is also a continuation-in-part of International Application No. PCT/US2013/053721, filed Aug. 6, 2013, and titled, "SECURE INDUSTRIAL CONTROL SYSTEM." The present application is also a continuation-in-part under 35 U.S.C. § 120 of U.S. patent application Ser. No. 14/469,931, filed Aug. 27, 2014, and titled "SECURE INDUSTRIAL CONTROL SYSTEM" (now issued as U.S. Pat. No. 9,191,203). The present application is also a continuation-in-part under 35 U.S.C. § 120 of U.S. patent application Ser. No. 14/446,412, filed Jul. 30, 2014, and titled "INDUSTRIAL CONTROL SYSTEM CABLE" (now issued as U.S. Pat. No. 10,834,820), which claims priority under 35 U.S.C. § 119 (e) of U.S. Provisional Application Ser. No. 62/021,438, filed Jul. 7, 2014, and titled "INDUSTRIAL CONTROL SYSTEM CABLE." U.S. Provisional Application Ser. No. 62/021,438; U.S. patent application Ser. No. 14/446,412; U.S. patent application Ser. No. 14/469,931; U.S. patent application Ser. No. 14/519,066; U.S. patent application Ser. No. 17/093,950; and International Application No. PCT/US2013/053721 are herein incorporated by reference in their entireties.

BACKGROUND

Industrial control systems, such as standard industrial control systems (ICS) or programmable automation controllers (PAC), include various types of control equipment used in industrial production, such as supervisory control and data acquisition (SCADA) systems, distributed control systems (DCS), programmable logic controllers (PLC), and industrial safety systems certified to safety standards such as IEC1508. These systems are used in industries including electrical, water and wastewater, oil and gas production and refining, chemical, food, pharmaceuticals and robotics. Using information collected from various types of sensors to measure process variables, automated and/or operator-driven supervisory commands from the industrial control system can be transmitted to various actuator devices such as control valves, hydraulic actuators, magnetic actuators, electrical switches, motors, solenoids, and the like. These actuator devices collect data from sensors and sensor systems, open and close valves and breakers, regulate valves and motors, monitor the industrial process for alarm conditions, and so forth.

In other examples, SCADA systems can use open-loop control with process sites that may be widely separated geographically. These systems use Remote Terminal Units (RTUs) to send supervisory data to one or more control centers. SCADA applications that deploy RTU's include fluid pipelines, electrical distribution and large communication systems. DCS systems are generally used for real-time data collection and continuous control with high-bandwidth, low-latency data networks and are used in large campus industrial process plants, such as oil and gas, refining, chemical, pharmaceutical, food and beverage, water and wastewater, pulp and paper, utility power, and mining and metals. PLCs more typically provide Boolean and sequential logic operations, and timers, as well as continuous control and are often used in stand-alone machinery and robotics. Further, ICE and PAC systems can be used in facility processes for buildings, airports, ships, space stations, and the like (e.g., to monitor and control Heating, Ventilation, and Air Conditioning (HVAC) equipment and energy consumption). As industrial control systems evolve, new technologies are combining aspects of these various types of control systems. For instance, PACs can include aspects of SCADA, DCS, and PLCs.

SUMMARY

According to various embodiments of this disclosure, a secure industrial control system includes one or more communications/control modules that control or drive one or more industrial elements (e.g., input/output (I/O) modules, power modules, field devices, switches, workstations, and/or physical interconnect devices). Operator actions and/or other commands or requests can be secured via an authentication path from an action originator to a communications/control module. In implementations, the industrial control system requires an action authenticator to sign an action request generated by the action originator. The destination communications/control module is configured to receive the signed action request, verify the authenticity of the signed action request, and perform a requested action when the authenticity of the signed action request is verified. In this manner, malicious or otherwise unauthorized action requests are not processed, and thus the system is protected from malware, spyware, unauthorized changes of control parameters, unauthorized access to data, and so forth.

In some embodiments, the communications/control module includes at least one processor and a non-transitory medium bearing a set of instructions executable by the processor. The set of instructions includes at least instructions to: receive an action request initiated by an action originator and signed by an action authenticator; verify the authenticity of the signed action request; and perform a requested action when the authenticity of the signed action request is verified.

Further, a method of authenticating a requested action is disclosed. The method includes: signing an action request with an action authenticator; sending the signed action request to a communications/control module; verifying the authenticity of the signed action request; and performing a requested action with the communications/control module when the authenticity of the signed action request is verified.

This Summary is provided to introduce a selection of concepts in a simplified form that are further described below in the Detailed Description. (This Summary is not intended to identify key features or essential features of the claimed subject matter, nor is it intended to be used as an aid in determining the scope of the claimed subject matter.)

DRAWINGS

The Detailed Description is described with reference to the accompanying figures. The use of the same reference numbers in different instances in the description and the figures may indicate similar or identical items.

DETAILED DESCRIPTION

Overview

In industrial control systems, various industrial elements/subsystems (e.g., input/output (I/O) modules, power modules, process sensors and/or actuators, switches, workstations, and/or physical interconnect devices) are controlled or driven by control elements/subsystems (e.g., one or more communications/control modules). The control elements/subsystems operate according to programming and action requests (e.g., executable software modules, control commands, data requests, and the like) received from an action originator such as, but not limited to: an operator interface (e.g., SCADA or human machine interface (HMI)), an engineering interface, a local application, and/or a remote application. Where multiple action originators are present, the industrial control system can be vulnerable to unauthorized access to data and/or controls. Further, the industrial control system can be vulnerable to malware, spyware, or other corrupt/malicious software that can be transmitted in the form of an update, application image, control command, or the like. Simply authenticating the operator may not be enough to secure the system from malicious actors or even unintentionally unauthorized requests/commands that can be originated via a valid login or a seemingly valid (e.g., hacked) application or operator/engineering interface.

The present disclosure is directed to industrial control system communications/control modules, subsystems and techniques for preventing unauthorized action requests from being processed in an industrial control system. In embodiments, a predefined selection of operations or all operator actions and/or other control actions or requests are secured via an authentication path from an action originator to a communications/control module. In implementations, the industrial control system requires an action authenticator to sign an action request generated by the action originator. Unsigned action requests may automatically result in an error and will not be processed or executed by the communications/control module. The communications/control module is configured to receive the signed action request, verify the authenticity of the signed action request, and perform a requested action when the authenticity of the signed action request is verified. In this manner, malicious or otherwise unauthorized action requests are not processed, and thus the system is protected from malware, spyware, unauthorized changes of control parameters, unauthorized access to data, and so forth.

Example Implementations

Figure 1:
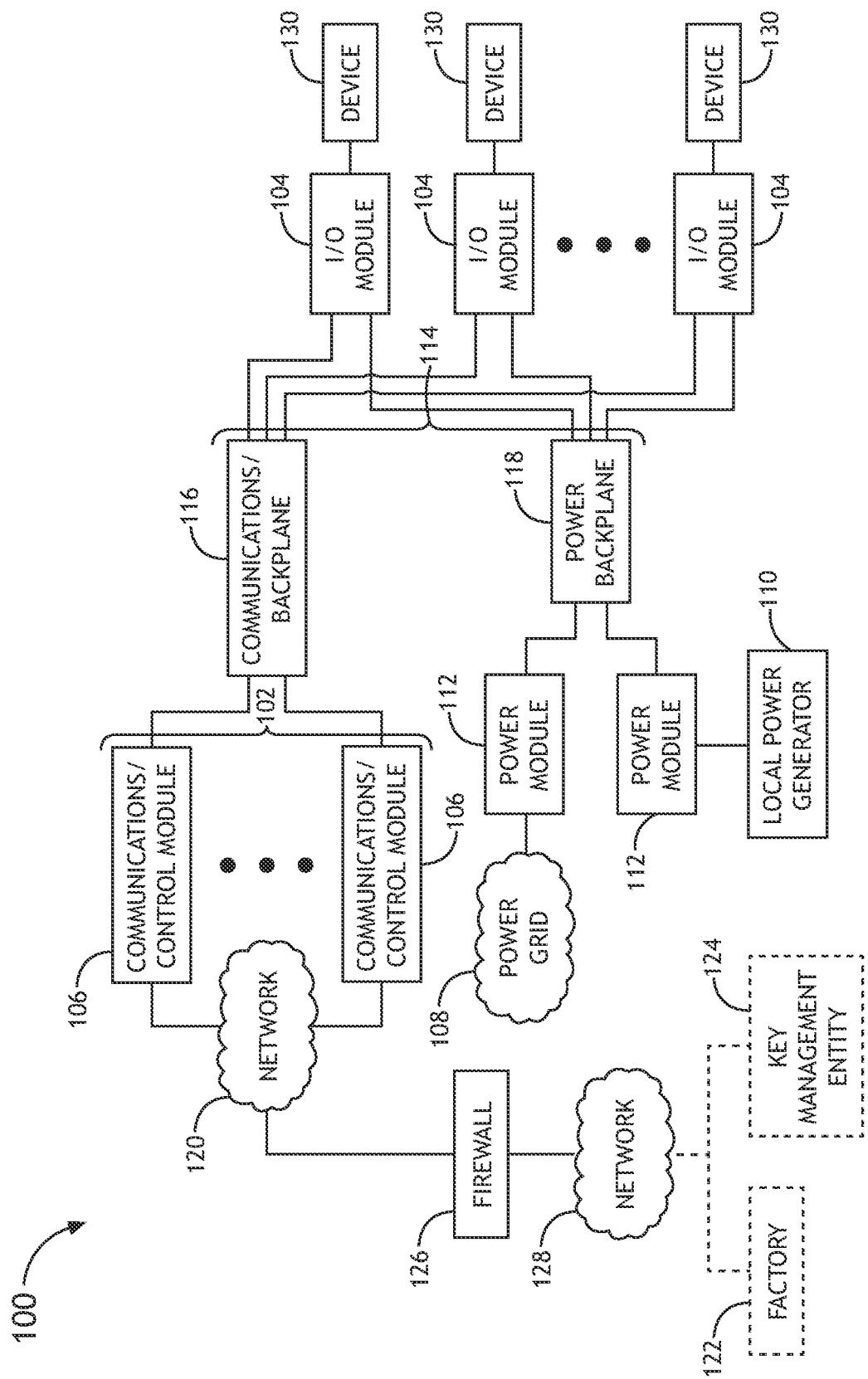
FIG. 1 is a block diagram illustrating an industrial control system in accordance with example embodiments of the present disclosure.

FIG. 1 illustrates an industrial control system 100 in accordance with an example embodiment of the present disclosure. In embodiments, the industrial control system 100 may comprise an industrial control system (ICS), a programmable automation controller (PAC), a supervisory control and data acquisition (SCADA) system, a distributed control system (DCS), programmable logic controller (PLC), and industrial safety system certified to safety standards such as IEC1508, or the like. As shown in FIG. 1, the industrial control system 100 uses a communications control architecture to implement a distributed control system that includes one or more industrial elements (e.g., input/output modules, power modules, field devices, switches, workstations, and/or physical interconnect devices) that are controlled or driven by one or more control elements or subsystems 102 distributed throughout the system. For example, one or more I/O modules 104 may be connected to one or more communications/control modules 106 making up the control element/subsystem 102. The industrial control system 100 is configured to transmit data to and from the I/O modules 104. The I/O modules 104 can comprise input modules, output modules, and/or input and output modules. For instance, input modules can be used to receive information from input devices 130 (e.g., sensors) in the process, while output modules can be used to transmit instructions to output devices (e.g., actuators). For example, an I/O module 104 can be connected to a process sensor for measuring pressure in piping for a gas plant, a refinery, and so forth and/or connected to a process actuator for controlling a valve, binary or multiple state switch, transmitter, or the like. Field devices 130 are communicatively coupled with the IO modules 104 either directly or via network connections. These devices 130 can include control valves, hydraulic actuators, magnetic actuators, motors, solenoids, electrical switches, transmitters, input sensors/receivers (e.g., illumination, radiation, gas, temperature, electrical, magnetic, and/or acoustic sensors) communications sub-busses, and the like.

In implementations, the I/O modules 104 can be used the industrial control system 100 collect data in applications including, but not necessarily limited to critical infrastructure and/or industrial processes, such as product manufacturing and fabrication, utility power generation, oil, gas, and chemical refining; pharmaceuticals, food and beverage, pulp and paper, metals and mining and facility and large campus industrial processes for buildings, airports, ships, and space stations (e.g., to monitor and control Heating, Ventilation, and Air Conditioning (HVAC) equipment and energy consumption).

In implementations, an I/O module 104 can be configured to convert analog data received from the sensor to digital data (e.g., using Analog-to-Digital Converter (ADC) circuitry, and so forth). An I/O module 104 can also be connected to one or more process actuators such as a motor or a regulating valve or an electrical relay and other forms of actuators and configured to control one or more operating characteristics of the motor, such as motor speed, motor torque, or position of the regulating valve or state of the electrical relay and so forth. Further, the I/O module 104 can be configured to convert digital data to analog data for transmission to the actuator (e.g., using Digital-to-Analog (DAC) circuitry, and so forth). In implementations, one or more of the I/O modules 104 can comprise a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more I/O modules 104 can be used to provide fault tolerant and redundant connections for various field devices 130 such as control valves, hydraulic actuators, magnetic actuators, motors, solenoids, electrical switches, transmitters, input sensors/receivers (e.g., illumination, radiation, gas, temperature, electrical, magnetic, and/or acoustic sensors) communications sub-busses, and the like.

Each I/O module 104 can be provided with a unique identifier (ID) for distinguishing one I/O module 104 from another I/O module 104. In implementations, an I/O module 104 is identified by its ID when it is connected to the industrial control system 100. Multiple I/O modules 104 can be used with the industrial control 100 to provide redundancy. For example, two or more I/O modules 104 can be connected to a process sensor and/or actuator. Each I/O module 104 can include one or more ports that furnish a physical connection to hardware and circuitry included with the I/O module 104, such as a printed circuit board (PCB), and so forth. For example, each I/O module 104 includes a connection for a cable that connects the cable to a printed wiring board (PWB) in the I/O module 104.

One or more of the I/O modules 104 can include an interface for connecting to other networks including, but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 104 can include a connection for connecting an I/O module 104 to a computer bus, and so forth.

The communications/control modules 106 can be used to monitor and control the I/O modules 104, and to connect two or more I/O modules 104 together. In embodiments of the disclosure, a communications/control module 106 can update a routing table when an I/O module 104 is connected to the industrial control system 100 based upon a unique ID for the I/O module 104. Further, when multiple redundant I/O modules 104 are used, each communications/control module 106 can implement mirroring of informational databases regarding the I/O modules 104 and update them as data is received from and/or transmitted to the I/O modules 104. In some embodiments, two or more communications/control module 106 are used to provide redundancy. For added security, the communications/control module 106 can be configured to perform an authentication sequence or handshake to authenticate one another at predefined events or times including such as startup, reset, installation of a new control module 106, replacement of a communications/control module 106, periodically, scheduled times, and the like.

Figure 2:
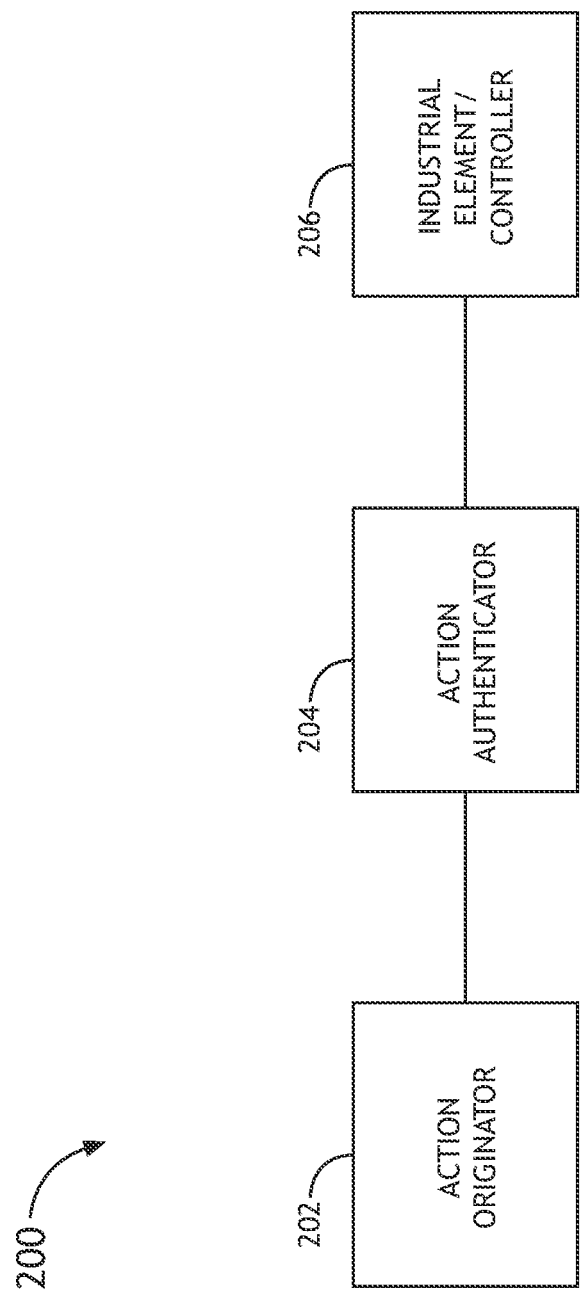
FIG. 2 is a block diagram illustrating an action authentication path for the industrial control system in accordance with example embodiments of the present disclosure.
Figure 3:
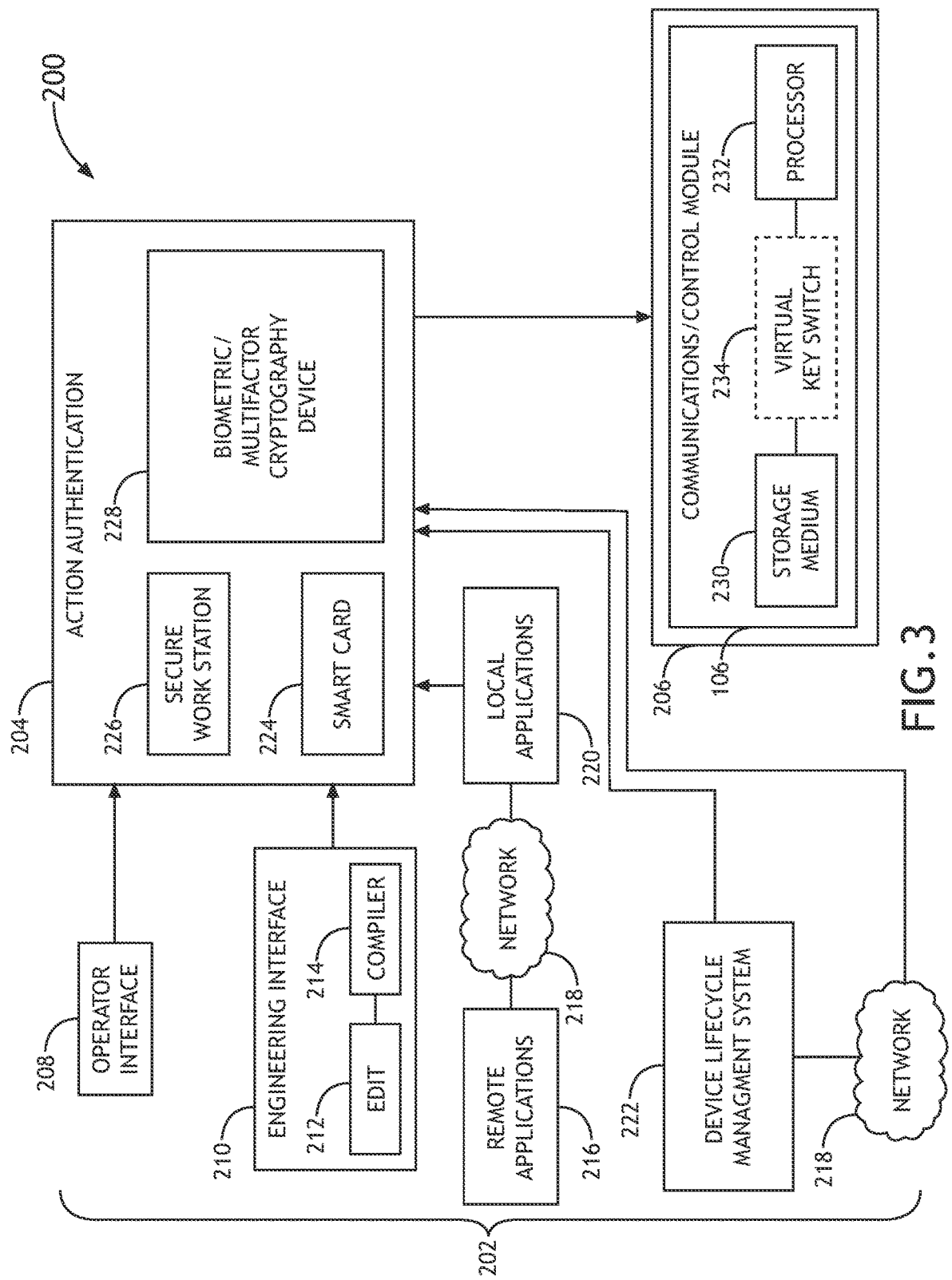
FIG. 3 is a block diagram further illustrating the action authentication path in accordance with example embodiments of the present disclosure.

As shown in FIGS. 2 and 3, each communications/control module 106 or any other industrial element/controller 206 (e.g., I/O module 104, field device 130 such as an actuator or sensor, physical interconnect device, switch, power module 112, or the like) can be at least partially operated according to requests/commands from an action originator 202. In implementations, the action originator 202 includes an operator interface 208 (e.g., SCADA or HMI), an engineering interface 210 including an editor 212 and a compiler 214, a local application 220, a remote application 216 (e.g., communicating through a network 218 via a local application 220), or the like. In the authentication path 200 illustrated in FIGS. 2 and 3, the industrial element/controller 206 (e.g., communications/control module 106, I/O module 104, field device 130 such as an actuator or sensor, physical interconnect device, switch, power module 112, or the like) processes an action request (e.g., request for data, control command, firmware/software update, set point control, application image download, or the like) only when the action request has been signed and/or encrypted by an action authenticator 204. This prevents unauthorized action requests from valid user profiles and further secures the system from unauthorized action requests coming from invalid (e.g., hacked) profiles.

The action authenticator 204 can either be on-site with the action originator 202 (e.g., directly connected device lifecycle management system ("DLM") 222 or secured workstation 226) or remotely located (e.g., DLM 222 connected via the network 218). In general, the action authenticator 204 includes a storage medium with a private key stored thereon and a processor configured to sign and/or encrypt the action request generated by the action originator 202 with the private key. The private key is stored in a memory that cannot be accessed via standard operator login. For instance, the secured workstation 226 can require a physical key, portable encryption device (e.g., smart card, RFID tag, or the like), and/or biometric input for access.

In some embodiments, the action authenticator 204 includes a portable encryption device such as a smart card 224 (which can include a secured microprocessor). The advantage of using a portable encryption device is that the entire device (including the privately stored key and processor in communication therewith) can be carried with an operator or user that has authorized access to an interface of the action originator 202. Whether the action authentication node 204 accesses the authentication path 200 via secured or unsecured workstation, the action request from the action originator 202 can be securely signed and/or encrypted within the architecture of the portable encryption device instead of a potentially less secure workstation or cloud-based architecture. This secures the industrial control system 100 from unauthorized actions. For instance, an unauthorized person would have to physically take possession of the smart card 224 before being able to authenticate any action requests sent via the action originator 202.

Furthermore, multiple layers of security can be employed. For example, the action authenticator 204 can include a secured workstation 226 that is only accessible to sign and/or encrypt action requests via smart card access or the like. Additionally, the secured workstation 226 can be accessible via a biometric or multifactor cryptography device 228 (e.g., fingerprint scanner, iris scanner, and/or facial recognition device). In some embodiments, a multifactor cryptography device 228 requires a valid biometric input before enabling the smart card 224 or other portable encryption device to sign the action request.

The communications/control module 106 or any other industrial element/controller 206 being driven by the action originator 202 is configured to receive the signed action request, verify the authenticity of the signed action request, and perform a requested action when the authenticity of the signed action request is verified. In some embodiments, the industrial element/controller 206 includes a storage medium 230 (e.g., SD/micro-SD card, HDD, SSD, or any other non-transitory storage device) configured to store the action request (e.g., application image, control command, and/or any other data sent by the action originator). The communications/control module 106 or any other industrial element/controller 206 further includes a processor 232 that performs/executes the action request (i.e., performs the requested action) after the signature is verified. In some embodiments, the action request is encrypted by the action originator 202 and/or the action authenticator 232 and must also be decrypted by the processor 232 before the requested action can be performed. In implementations, the communications/control module 106 or any other industrial element/controller 206 includes a virtual key switch 234 (e.g., a software module running on the processor 232) that enables the processor 232 to perform the requested action only after the action request signature is verified and/or after the action request is decrypted. In some embodiments, each and every action or each one of a selection of critical actions must clear the authentication path before being run on the communications/control module 106 or any other industrial element/controller 206.

Figure 4:
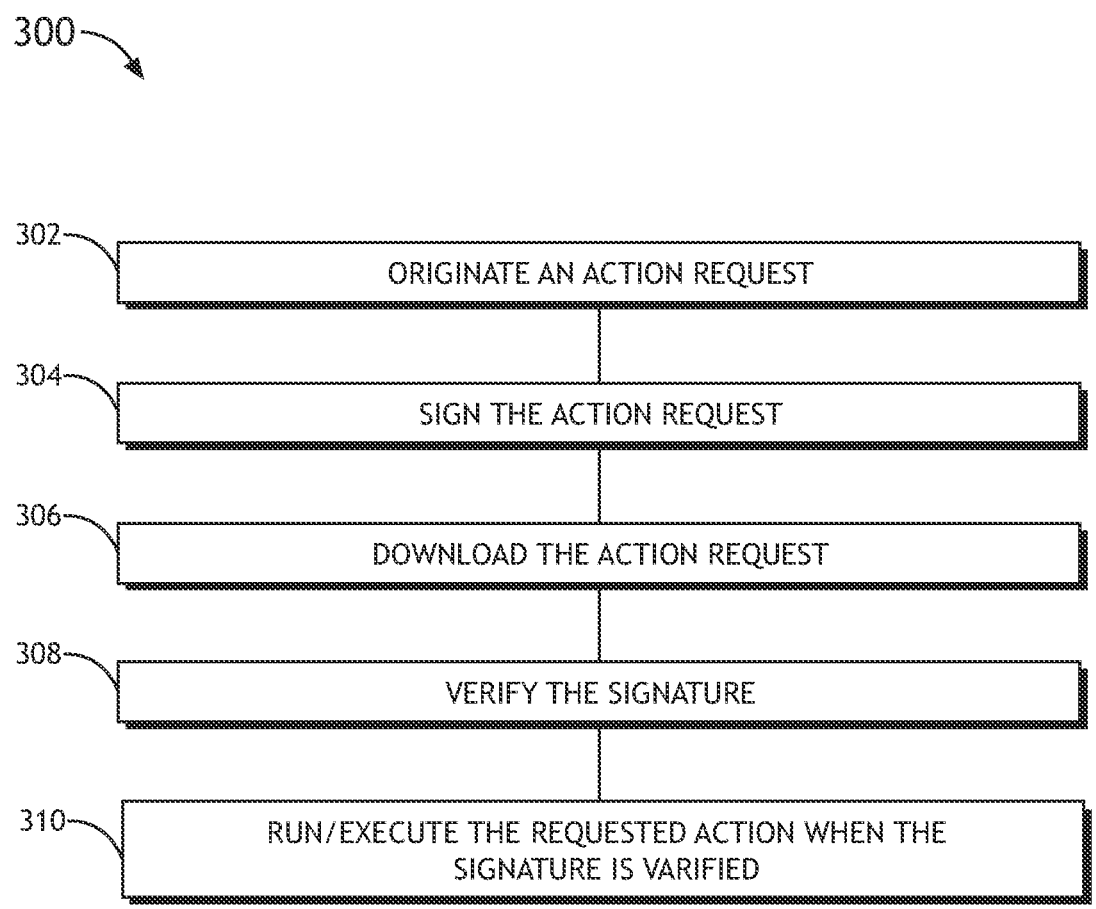
FIG. 4 is a flow diagram illustrating a method of authenticating an action request in accordance with example embodiments of the present disclosure.
Figure 5:
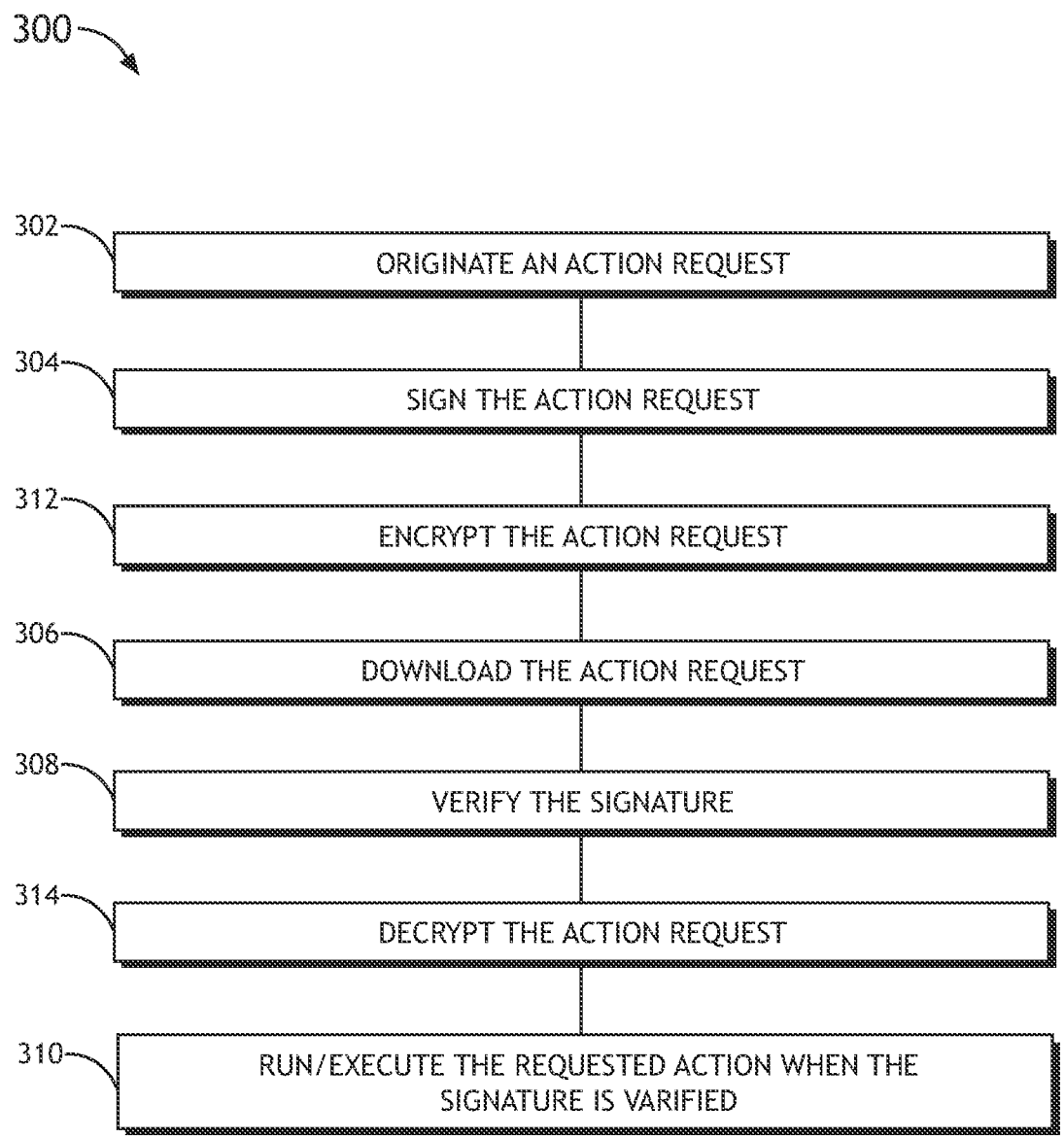
FIG. 5 is a flow diagram further illustrating the method of authenticating the action request in accordance with example embodiments of the present disclosure.

FIGS. 4 and 5 illustrate a method 300 of authenticating an action request in accordance with exemplary embodiments of this disclosure. In implementations, the method 300 can be manifested by the industrial control system 100 and/or authentication path 200 of the industrial control system 100. The method 300 includes: (302) originating an action request (e.g., via an operator/engineering interface 208/210 or a remote/local application interface 216/220); (304) signing the action request with the action authenticator 204; (312) optionally encrypting the action request with the action authenticator 204; (306) sending or downloading the signed action request to a communications/control module 106 or any other industrial element/controller 206; (308) verifying the authenticity of the signed action request; (314) optionally decrypting the action request with the communications/control module 106 or any other industrial element/controller 206; and (310) performing a requested action with the communications/control module 106 or any other industrial element/controller 206 when the authenticity of the signed action request is verified.

For enhanced security, the communications/control module 106 or any other industrial element/controller 206 can be further configured to perform an authentication sequence with the action authenticator 204 (e.g., with a smart card 224 or the like) before the requested action is run by the communications/control module 106 or any other industrial element/controller 206. For example, the so-called "handshake" can be performed prior to step 310 or even prior to step 306. In some embodiments, the signature and verification steps 304 and 308 can be completely replaced with a more intricate authentication sequence. Alternatively, the authentication sequence can be performed as an additional security measure to augment the simpler signature verification and/or decryption measures.

In some embodiments, the authentication sequence implemented by the communications/control module 106 or any other industrial element/controller 206 can include: sending a request datagram to the action authenticator 204, the request datagram including a first nonce, a first device authentication key certificate (e.g., a first authentication certificate that contains a device authentication key), and a first identity attribute certificate; receiving a response datagram from the action authenticator 204, the response datagram including a second nonce, a first signature associated with the first and second nonces, a second device authentication key certificate (e.g., a second authentication certificate that contains a device authentication key), and a second identity attribute certificate; validating the response datagram by verifying the first signature associated with the first and second nonces, the second device authentication key certificate, and the second identity attribute certificate; and sending an authentication datagram to the action authenticator 204 when the response datagram is valid, the authentication datagram including a second signature associated with the first and second nonces.

Alternatively, the action authenticator 204 can initiate the handshake, in which case the authentication sequence implemented by the communications/control module 106 or any other industrial element/controller 206 can include: receiving a request datagram from the action authenticator 204, the request datagram including a first nonce, a first device authentication key certificate, and a first identity attribute certificate; validating the request datagram by verifying the first device authentication key certificate and the first identity attribute certificate; sending a response datagram to the action authenticator 204 when the request datagram is valid, the response datagram including a second nonce, a first signature associated with the first and second nonces, a second device authentication key certificate, and a second identity attribute certificate; receiving an authentication datagram from the action authenticator 204, the authentication datagram including a second signature associated with the first and second nonces; and validating the authentication datagram by verifying the second signature associated with the first and second nonces.

The handshake or authentication sequence that can be implemented by the communications/control module 106 or any other industrial element/controller 206 and the action authenticator 204 is further described in co-pending U.S. Non-provisional Application Ser. No. 14/519,047, titled "INDUSTRIAL CONTROL SYSTEM REDUNDANT COMMUNICATIONS/CONTROL MODULES AUTHENTICATION," by Timothy Clish et al., filed Oct. 20, 2014, fully incorporated herein by reference. Those skilled in the art will appreciate the applicability of the handshake between redundant communications/control modules 106 to the handshake described herein between the communications/control module 106 or any other industrial element/controller 206 and the action authenticator 204.

Each of the action originator 202, the action authenticator 204, and communications/control module 106 or any other industrial element/controller 206 can include circuitry and/or logic enabled to perform the functions or operations (e.g., blocks of method 300 and the authentication sequence) described herein. For example, each of the action originator 202, the action authenticator 204, and the communications/control module 106 or any other industrial element/controller 206 can include one or more processors that execute program instruction stored permanently, semi-permanently, or temporarily by a non-transitory machine readable medium such as, but not limited to: a hard disk drive (HDD), solid-state disk (SDD), optical disk, magnetic storage device, flash drive, or SD/micro-SD card.

Referring again to FIG. 1, data transmitted by the industrial control system 100 can be packetized, i.e., discrete portions of the data can be converted into data packets comprising the data portions along with network control information, and so forth. The industrial control system 100 can use one or more protocols for data transmission, including a bit-oriented synchronous data link layer protocol such as High-Level Data Link Control (HDLC). In some embodiments, the industrial control system 100 implements HDLC according to an International Organization for Standardization (ISO) 13239 standard, or the like. Further, two or more communications/control modules 106 can be used to implement redundant HDLC. However, it should be noted that HDLC is provided by way of example only and is not meant to be restrictive of the present disclosure. Thus, the industrial control system 100 can use other various communications protocols in accordance with the present disclosure.

One or more of the communications/control module 106 can be configured for exchanging information with components used for monitoring and/or controlling the field devices 130 (e.g., sensor and/or actuator instrumentation) connected to the industrial control system 100 via the I/O modules 104, such as one or more control loop feedback mechanisms/controllers. In implementations, a controller can be configured as a microcontroller/Programmable Logic Controller (PLC), a Proportional-Integral-Derivative (PID) controller, and so forth. In some embodiments, the I/O modules 104 and the communications/control modules 106 include network interfaces, e.g., for connecting one or more I/O modules 104 to one or more controllers via a network. In implementations, a network interface can be configured as a Gigabit Ethernet interface for connecting the I/O modules 104 to a Local Area Network (LAN). Further, two or more communications/control modules 106 can be used to implement redundant Gigabit Ethernet. However, it should be noted that Gigabit Ethernet is provided by way of example only and is not meant to be restrictive of the present disclosure. Thus, a network interface can be configured for connecting the communications/control modules 106 to other various networks including, but not necessarily limited to: a wide-area cellular telephone network, such as a 3G cellular network, a 4G cellular network, or a GSM network; a wireless computer communications network, such as a Wi-Fi network (e.g., a WLAN operated using IEEE 802.11 network standards); a PAN (e.g., a WPAN operated using IEEE 802.15 network standards); a WAN; an intranet; an extranet; an internet; the Internet; and so on. Additionally, a network interface can be implemented using a computer bus. For example, a network interface can include a Peripheral Component Interconnect (PCI) card interface, such as a Mini PCI interface, and so forth. Further, the network can be configured to include a single network or multiple networks across different access points.

The industrial control system 100 can receive electrical power from multiple sources. For example, AC power is supplied from a power grid 108 (e.g., using high voltage power from AC mains). AC power can also be supplied using local power generation (e.g., an on-site turbine or diesel local power generator 110). A power supply 112 is used to distribute electrical power from the power grid 108 to automation equipment of the industrial control system 100, such as controllers, I/O modules, and so forth. A power supply 112 can also be used to distribute electrical power from the local power generator 110 to the industrial control system equipment. The industrial control system 100 can also include additional (backup) power supplies configured to store and return DC power using multiple battery modules. For example, a power supply 112 functions as a UPS. In embodiments of the disclosure, multiple power supplies 112 can be distributed (e.g., physically decentralized) within the industrial control system 100.

In some embodiments, the control elements/subsystems and/or industrial elements (e.g., the I/O modules 104, the communications/control modules 106, the power supplies 112, and so forth) are connected together by one or more backplanes 114. For example, communications/control modules 106 can be connected to I/O modules 104 by a communications backplane 116. Further, power supplies 112 can be connected to I/O modules 104 and/or to communications/control modules 106 by a power backplane 118. In some embodiments, physical interconnect devices (e.g., switches, connectors, or cables such as, but not limited to, those described in U.S. Non-provisional application Ser. No. 14/446,412) are used to connect to the I/O modules 104, the communications/control modules 106, the power supplies 112, and possibly other industrial control system equipment. For example, a cable can be used to connect a communications/control module 106 to a network 120, another cable can be used to connect a power supply 112 to a power grid 108, another cable can be used to connect a power supply 112 to a local power generator 110, and so forth.

In some embodiments, the industrial control system 100 implements a secure control system. For example, the industrial control system 100 includes a security credential source (e.g., a factory 122) and a security credential implementer (e.g., a key management entity 124). The security credential source is configured to generate a unique security credential (e.g., a key, a certificate, etc., such as a unique identifier, and/or a security credential). The security credential implementer is configured to provision the control elements/subsystems and/or industrial elements (e.g., cables, devices 130, I/O modules 104, communications/control modules 106, power supplies 112, and so forth) with a unique security credential generated by the security credential source.

Multiple (e.g., every) device 130, I/O module 104, communications/control module 106, power supply 112, physical interconnect devices, etc., of the industrial control system 100 can be provisioned with security credentials for providing security at multiple (e.g., all) levels of the industrial control system 100. Still further, the control elements/subsystems and/or industrial elements including the sensors and/or actuators and so forth, can be provisioned with the unique security credentials (e.g., keys, certificates, etc.) during manufacture (e.g., at birth), and can be managed from birth by a key management entity 124 of the industrial control system 100 for promoting security of the industrial control system 100.

In some embodiments, communications between the control elements/subsystems and/or industrial elements including the sensors and/or actuators and so forth, of the industrial control system 100 includes an authentication process. The authentication process can be performed for authenticating control elements/subsystem and/or industrial elements including the sensors and/or actuators and so forth, implemented in the industrial control system 100. Further, the authentication process can utilize security credentials associated with the element and/or physical interconnect device for authenticating that element and/or physical interconnect device. For example, the security credentials can include encryption keys, certificates (e.g., public key certificates, digital certificates, identity certificates, security certificates, asymmetric certificates, standard certificates, non-standard certificates) and/or identification numbers.

In implementations, multiple control elements/subsystems and/or industrial elements of the industrial control system 100 are provisioned with their own unique security credentials. For example, each element of the industrial control system 100 may be provisioned with its own unique set(s) of certificates, encryption keys and/or identification numbers when the element is manufactured (e.g., the individual sets of keys and certificates are defined at the birth of the element). The sets of certificates, encryption keys and/or identification numbers are configured for providing/supporting strong encryption. The encryption keys can be implemented with standard (e.g., commercial off-the-shelf (COTS)) encryption algorithms, such as National Security Agency (NSA) algorithms, National Institute of Standards and Technology (NIST) algorithms, or the like.

Based upon the results of the authentication process, the element being authenticated can be activated, partial functionality of the element can be enabled or disabled within the industrial control system 100, complete functionality of the element can be enabled within the industrial control system 100, and/or functionality of the element within the industrial control system 100 can be completely disabled (e.g., no communication facilitated between that element and other elements of the industrial control system 100).

In embodiments, the keys, certificates and/or identification numbers associated with an element of the industrial control system 100 can specify the original equipment manufacturer (OEM) of that element. As used herein, the term "original equipment manufacturer" or "OEM" can be defined as an entity that physically manufactures the device (e.g., element) and/or a supplier of the device such as an entity that purchases the device from a physical manufacturer and sells the device. Thus, in embodiments, a device can be manufactured and distributed (sold) by an OEM that is both the physical manufacturer and the supplier of the device. However, in other embodiments, a device can be distributed by an OEM that is a supplier, but is not the physical manufacturer. In such embodiments, the OEM can cause the device to be manufactured by a physical manufacturer (e.g., the OEM can purchase, contract, order, etc. the device from the physical manufacturer).

Additionally, where the OEM comprises a supplier that is not the physical manufacturer of the device, the device can bear the brand of the supplier instead of brand of the physical manufacturer. For example, in embodiments where an element (e.g., a communications/control module 106) is associated with a particular OEM that is a supplier but not the physical manufacturer, the element's keys, certificates and/or identification numbers can specify that origin. During authentication of an element of the industrial control system 100, when a determination is made that an element being authenticated was manufactured or supplied by an entity that is different than the OEM of one or more other elements of the industrial control system 100, then the functionality of that element can be at least partially disabled within the industrial control system 100. For example, limitations can be placed upon communication (e.g., data transfer) between that element and other elements of the industrial control system 100, such that the element cannot work/function within the industrial control system 100. When one of the elements of the industrial control system 100 requires replacement, this feature can prevent a user of the industrial control system 100 from unknowingly replacing the element with a non-homogenous element (e.g., an element having a different origin (a different OEM) than the remaining elements of the industrial control system 100) and implementing the element in the industrial control system 100. In this manner, the techniques described herein can prevent the substitution of elements of other OEM's into a secure industrial control system 100. In one example, the substitution of elements that furnish similar functionality in place of elements provided by an originating OEM can be prevented, since the substituted elements cannot authenticate and operate within the originating OEM's system. In another example, a first reseller can be provided with elements having a first set of physical and cryptographic labels by an originating OEM, and the first reseller's elements can be installed in an industrial control system 100. In this example, a second reseller can be provided with elements having a second (e.g., different) set of physical and cryptographic labels by the same originating OEM. In this example, the second reseller's elements may be prevented from operating within the industrial control system 100, since they may not authenticate and operate with the first reseller's elements. However, it should also be noted that the first reseller and the second reseller may enter into a mutual agreement, where the first and second elements can be configured to authenticate and operate within the same industrial control system 100. Further, in some embodiments, an agreement between resellers to allow interoperation can also be implemented so the agreement only applies to a specific customer, group of customers, facility, etc.

In another instance, a user can attempt to implement an incorrectly designated (e.g., mismarked) element within the industrial control system 100. For example, the mismarked element can have a physical indicia marked upon it which falsely indicates that the element is associated with the same OEM as the OEM of the other elements of the industrial control system 100. In such instances, the authentication process implemented by the industrial control system 100 can cause the user to be alerted that the element is counterfeit. This process can also promote improved security for the industrial control system 100, since counterfeit elements are often a vehicle by which malicious software can be introduced into the industrial control system 100. In embodiments, the authentication process provides a secure air gap for the industrial control system 100, ensuring that the secure industrial control system is physically isolated from insecure networks.

In implementations, the secure industrial control system 100 includes a key management entity 124. The key management entity 124 can be configured for managing cryptographic keys (e.g., encryption keys) in a cryptosystem. This managing of cryptographic keys (e.g., key management) can include the generation, exchange, storage, use, and/or replacement of the keys. For example, the key management entity 124 is configured to serve as a security credentials source, generating unique security credentials (e.g., public security credentials, secret security credentials) for the elements of the industrial control system 100. Key management pertains to keys at the user and/or system level (e.g., either between users or systems).

In embodiments, the key management entity 124 comprises a secure entity such as an entity located in a secure facility. The key management entity 124 can be remotely located from the I/O modules 104, the communications/control modules 106, and the network 120. For example, a firewall 126 can separate the key management entity 124 from the control elements or subsystems 102 and the network 120 (e.g., a corporate network). In implementations, the firewall 126 can be a software and/or hardware-based network security system that controls ingoing and outgoing network traffic by analyzing data packets and determining whether the data packets should be allowed through or not, based on a rule set. The firewall 126 thus establishes a barrier between a trusted, secure internal network (e.g., the network 120) and another network 128 that is not assumed to be secure and trusted (e.g., a cloud and/or the Internet). In embodiments, the firewall 126 allows for selective (e.g., secure) communication between the key management entity 124 and one or more of the control elements or subsystems 102 and/or the network 120. In examples, one or more firewalls can be implemented at various locations within the industrial control system 100. For example, firewalls can be integrated into switches and/or workstations of the network 120.

The secure industrial control system 100 can further include one or more manufacturing entities (e.g., factories 122). The manufacturing entities can be associated with original equipment manufacturers (OEMs) for the elements of the industrial control system 100. The key management entity 124 can be communicatively coupled with the manufacturing entity via a network (e.g., a cloud). In implementations, when the elements of the industrial control system 100 are being manufactured at one or more manufacturing entities, the key management entity 124 can be communicatively coupled with (e.g., can have an encrypted communications pipeline to) the elements. The key management entity 124 can utilize the communications pipeline for provisioning the elements with security credentials (e.g., inserting keys, certificates and/or identification numbers into the elements) at the point of manufacture.

Further, when the elements are placed into use (e.g., activated), the key management entity 124 can be communicatively coupled (e.g., via an encrypted communications pipeline) to each individual element worldwide and can confirm and sign the use of specific code, revoke (e.g., remove) the use of any particular code, and/or enable the use of any particular code. Thus, the key management entity 124 can communicate with each element at the factory where the element is originally manufactured (e.g., born), such that the element is born with managed keys. A master database and/or table including all encryption keys, certificates and/or identification numbers for each element of the industrial control system 100 can be maintained by the key management entity 124. The key management entity 124, through its communication with the elements, is configured for revoking keys, thereby promoting the ability of the authentication mechanism to counter theft and re-use of components.

In implementations, the key management entity 124 can be communicatively coupled with one or more of the control elements/subsystems, industrial elements, and/or the network 120 via another network (e.g., a cloud and/or the Internet) and firewall. For example, in embodiments, the key management entity 124 can be a centralized system or a distributed system. Moreover, in embodiments, the key management entity 124 can be managed locally or remotely. In some implementations, the key management entity 124 can be located within (e.g., integrated into) the network 120 and/or the control elements or subsystems 102. The key management entity 124 can provide management and/or can be managed in a variety of ways. For example, the key management entity 124 can be implemented/managed: by a customer at a central location, by the customer at individual factory locations, by an external third party management company and/or by the customer at different layers of the industrial control system 100, and at different locations, depending on the layer.

Varying levels of security (e.g., scalable, user-configured amounts of security) can be provided by the authentication process. For example, a base level of security can be provided which authenticates the elements and protects code within the elements. Other layers of security can be added as well. For example, security can be implemented to such a degree that a component, such as the communications/control module 106, cannot power up without proper authentication occurring. In implementations, encryption in the code is implemented in the elements, while security credentials (e.g., keys and certificates) are implemented on the elements. Security can be distributed (e.g., flows) through the industrial control system 100. For example, security can flow through the industrial control system 100 all the way to an end user, who knows what a module is designed to control in that instance. In embodiments, the authentication process provides encryption, identification of devices for secure communication and authentication of system hardware or software components (e.g., via digital signature).

In implementations, the authentication process can be implemented to provide for and/or enable interoperability within the secure industrial control system 100 of elements manufactured and/or supplied by different manufacturers/vendors/suppliers (e.g., OEMs). For example, selective (e.g., some) interoperability between elements manufactured and/or supplied by different manufacturers/vendors/suppliers can be enabled. In embodiments, unique security credentials (e.g., keys) implemented during authentication can form a hierarchy, thereby allowing for different functions to be performed by different elements of the industrial control system 100.

The communication links connecting the components of the industrial control system 100 can further employ data packets, such as runt packets (e.g., packets smaller than sixty-four (64) bytes), placed (e.g., injected and/or stuffed) therein, providing an added level of security. The use of runt packets increases the level of difficulty with which outside information (e.g., malicious content such as false messages, malware (viruses), data mining applications, etc.) can be injected onto the communications links. For example, runt packets can be injected onto a communication link within gaps between data packets transmitted between the action originator 204 and the communications/control module 106 or any other industrial element/controller 206 to hinder an external entity's ability to inject malicious content onto the communication link.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A secure industrial control system, comprising:
an action authenticator including at least one processor in communication with a storage medium having a private key provisioned by the key management entity stored thereon configured to:
receive an action request from an action originator,
determine whether the received action request is an authorized action request,
sign the received action request with the private key thereby generating a signed version of the action request based on the determination, and
transmit the signed action request; and
a secure communications/control module in communication with one or more industrial elements, the one or more industrial elements including at least one input/output module operable to receive industrial sensor information or send control information to an industrial actuator or motor, the communications/control module including at least one processor and a non-transitory medium bearing a set of instructions executable by the at least one processor, the set of instructions including instructions to:
receive the signed action request from the action authenticator, the signed action request forming a part of a request datagram, the request datagram comprising a first nonce, a first device authenticating key certificate, and a first identity attribute certificate;
authenticate the received signed action request, wherein authenticating the received action request further comprises:
verifying that the request datagram is valid based on the first device authenticating key certificate and the first identity attribute certificate,
sending a response datagram to the action authenticator, the response datagram comprising a second nonce, a first signature associated with the first nonce and the second nonce, and a second identity attribute certificate,
receiving an authentication datagram from the action authenticator, the authentication datagram comprising a second signature associated with the first nonce and the second nonce, and
validating the authentication datagram by verifying the second signature associated with the first nonce and the second nonce; and
execute the action request based on whether the received action request is an authenticated action request.

2. The industrial control system of claim 1, wherein the action originator comprises at least one of: an operator interface, an engineering interface, a local application interface, and a remote application interface.

3. The secure industrial control system of claim 1, wherein the action authenticator comprises a portable encryption device that includes the at least one processor in communication with the storage medium having the private key stored thereon.

4. The secure industrial control system of claim 3, wherein the processor comprises an encrypted microprocessor.

5. The secure industrial control system of claim 3, wherein the portable encryption device comprises a smart card.

6. The secure industrial control system of claim 1, wherein the action authenticator comprises a secured workstation.

7. The secure industrial control system of claim 6, wherein the secured workstation is accessible via at least one of: a physical key, a portable encryption device, and a biometric cryptography device.

8. The secure industrial control system of claim 1, wherein the action authenticator is configured to encrypt the action request prior to transmission of the action request to the communication/control module.

9. The secure industrial control system of claim 1, wherein the communications/control module further includes a virtual key switch that enables the at least one processor to execute the action request upon authentication of the action request as the signed version of the action request.

10. The secure industrial control system of claim 1, wherein the communications/control module and the action authenticator are further configured to perform an authentication sequence.

11. The secure industrial control system of claim 1, wherein the one or more industrial elements further include at least one of: a communications/control module, a power module, a field device, a switch, a workstation, and a physical interconnect device.

12. A communications/control module, comprising:
at least one processor; and
a non-transitory medium bearing a set of instructions executable by the at least one processor, the set of instructions including instructions to:
receive an action request initiated at an action originator, the action request forming a part of a request datagram, the request datagram comprising a first nonce, a first device authenticating key certificate, and a first identity attribute certificate, wherein:
an unsigned version of the action request is transmitted from the action originator to an action authenticator located physically remote from the action originator,
the action authenticator determines whether the received action request is an authorized action request independent of the action originator,
the action authenticator generates a signed version of the action request based on the determination, and
the action authenticator transmits the signed action request to the communication/control module,
authenticate the signed action request wherein authenticating the received signed action request further comprises:
verifying that the request datagram is valid,
sending a response datagram to the action authenticator, the response datagram comprising a second nonce, a first signature associated with the first nonce and the second nonce, and a second identity attribute certificate,
receiving an authentication datagram from the action authenticator, the authentication datagram comprising a second signature associated with the first nonce and the second nonce, and
validating the authentication datagram by verifying the second signature associated with the first nonce and the second nonce;
determine an authenticity of the received action request based on whether the received action request is the signed version of the action request; and
perform an action associated with the received action request based on the determined authenticity.

13. The communications/control module of claim 12, further comprising:

a virtual key switch that enables the at least one processor to execute the received action request upon a determination that the received action request is a signed version of the action request.

14. The communications/control module of claim 12, wherein the received action request is an encrypted version of the action request and the set of instructions further includes instructions to decrypt the encrypted version of the action request.

15. The communications/control module of claim 12, wherein the instructions to execute the action request upon a determination that the action request is a signed version of the action request includes:

instructions to control a communicatively coupled industrial element including at least one of: a communications/control module, an input/output module, a power module, a field device, a switch, a workstation, and a physical interconnect device.

16. A secure communications/control module in communication with one or more industrial elements, the one or more industrial elements including at least one input/output module operable to receive industrial sensor information or send control information to an industrial actuator or motor, the communications/control module including at least one processor and a non-transitory medium bearing a set of instructions executable by the at least one processor, the set of instructions including instructions to:

receive an action request from an action authenticator, the action request forming a part of a request datagram, the request datagram comprising a first nonce, a first device authenticating key certificate, and a first identity attribute certificate;

authenticate the received action request based on a determination of whether the received action is a signed version of the action request, wherein authenticating the received action request further comprises:

verifying that the request datagram is valid, sending a response datagram to the action authenticator, the response datagram comprising a second nonce, a first signature associated with the first nonce and the second nonce, and a second identity attribute certificate, receiving an authentication datagram from the action authenticator, the authentication datagram comprising a second signature associated with the first nonce and the second nonce, and validating the authentication datagram by verifying the second signature associated with the first nonce and the second nonce; and execute the action request based on whether the received action request is an authenticated action request.

17. The secure communications/control module of claim 16, wherein the action request is an encrypted action request, the encryption action request having been encrypted by the action authenticator prior to transmission to the communication/control module.

18. The secure communications/control module of claim 16, wherein the action authenticator comprises at least one of: a portable encryption device, a secured workstation, and a device lifecycle management system.

19. The secure communications/control module of claim 16, wherein executing the action request further includes:

controlling a given industrial element according to the action request, the given industrial element including at least one of: a communications/control module, an input/output module, a power module, a field device, a switch, a workstation, and a physical interconnect device.

20. The secure communications/control module of claim 16, wherein the communications/control module and the at least one input/output module are configured to receive respective first and second unique security credentials at respective points of manufacture from the key management entity, the first and second unique security credentials being stored in respective memories of the communications/control module and the at least one input/output module, wherein at least one of the first and second unique security credentials is at least one of modifiable, revocable, or authenticatable by the key management entity at a site different from the respective point of manufacture of the respective one of the communications/control module and the at least one input/output module.

* * * * *